United States Patent
Takeshima et al.

(10) Patent No.: US 8,248,204 B2
(45) Date of Patent: Aug. 21, 2012

(54) TAG DETECTING SYSTEM, MOVING OBJECT DETECTING METHOD, AND ENTRANCE/EXIT MANAGEMENT SYSTEM

(75) Inventors: Masahiro Takeshima, Tokyo (JP);
Kazuo Tamura, Sanda (JP); Takeshi Kawahara, Kakogawa (JP); Masayoshi Kondou, Ichikawa (JP); Dai Kawarai, Komae (JP)

(73) Assignees: Hitachi, Ltd., Tokyo (JP); Hitachi Engineering & Services Co., Ltd., Hitachi-shi (JP); Matrix Inc., Osaka (JP)

( * ) Notice: Subject to any disclaimer, the term of this patent is extended or adjusted under 35 U.S.C. 154(b) by 476 days.

(21) Appl. No.: 12/404,073

(22) Filed: Mar. 13, 2009

(65) Prior Publication Data

US 2009/0179742 A1    Jul. 16, 2009

(51) Int. Cl.
*G05B 19/02* (2006.01)
*H04Q 5/22* (2006.01)

(52) U.S. Cl. ........ 340/4.34; 340/5.2; 340/10.1; 340/5.7; 340/10.4

(58) Field of Classification Search .................. 340/10.1, 340/10.3, 10.41, 12.1, 33, 572.7, 5.61–63, 340/928
See application file for complete search history.

(56) References Cited

U.S. PATENT DOCUMENTS

| | | | | |
|---|---|---|---|---|
| 4,016,553 A | * | 4/1977 | Novikoff et al. | 340/572.7 |
| 5,661,457 A | * | 8/1997 | Ghaffari et al. | 340/572.7 |
| 5,828,693 A | * | 10/1998 | Mays et al. | 375/136 |
| 5,864,306 A | * | 1/1999 | Dwyer et al. | 340/928 |
| 5,955,969 A | * | 9/1999 | D'Hont | 340/928 |
| 6,040,774 A | * | 3/2000 | Schepps | 340/572.1 |
| 6,218,932 B1 | * | 4/2001 | Stippler | 340/426.16 |
| 6,570,487 B1 | * | 5/2003 | Steeves | 340/5.2 |
| 6,658,264 B1 | * | 12/2003 | Irvin | 455/552.1 |
| 7,088,248 B2 | * | 8/2006 | Forster | 340/572.7 |
| 7,420,466 B2 | * | 9/2008 | Shafer | 340/572.1 |
| 7,468,670 B2 | * | 12/2008 | Liu et al. | 340/572.1 |
| 7,764,176 B2 | * | 7/2010 | Zhang et al. | 340/572.1 |
| 2003/0197612 A1 | * | 10/2003 | Tanaka et al. | 340/572.1 |
| 2006/0077039 A1 | * | 4/2006 | Ibi et al. | 340/10.1 |

(Continued)

FOREIGN PATENT DOCUMENTS

| | | | |
|---|---|---|---|
| JP | 9-231427 A | | 9/1997 |
| JP | 09231427 A | * | 9/1997 |
| JP | 11-250358 A | | 9/1999 |
| JP | 11250358 A | * | 9/1999 |

(Continued)

OTHER PUBLICATIONS

Japanese language Notice of Reason for Refusal dated Sep. 15, 2009 (Three (3) pages).

*Primary Examiner* — Daniel Wu
*Assistant Examiner* — Muhammad Adnan
(74) *Attorney, Agent, or Firm* — Crowell & Moring LLP

(57) ABSTRACT

A tag detecting system for detecting a movement of a person or an object that mounts an RFID tag, a moving object detecting method, and an entrance/exit management system using the moving object detecting system are provided. The tag detecting system detects a specific person or object by restricting a detection area of the RFID tag to a narrow area. Since the moving object detecting method detects a piggyback, the entrance/exit system prevents the piggyback even if there are a number of persons passing through an entrance/exit gate almost at the same time.

35 Claims, 16 Drawing Sheets

U.S. PATENT DOCUMENTS

| | | | |
|---|---|---|---|
| 2006/0244588 A1* | 11/2006 | Hannah et al. | 340/539.13 |
| 2007/0109099 A1* | 5/2007 | Raphaeli et al. | 340/10.2 |
| 2007/0221730 A1* | 9/2007 | McReynolds et al. | 235/451 |
| 2007/0241864 A1* | 10/2007 | Nagai | 340/10.1 |
| 2007/0296591 A1* | 12/2007 | Frederick et al. | 340/572.4 |
| 2008/0088450 A1* | 4/2008 | Kwan | 340/572.1 |
| 2008/0266092 A1* | 10/2008 | Campero et al. | 340/572.1 |
| 2008/0309461 A1* | 12/2008 | Mizuki et al. | 340/10.1 |
| 2009/0066484 A1* | 3/2009 | Mochizuki et al. | 340/10.51 |

FOREIGN PATENT DOCUMENTS

| | | | |
|---|---|---|---|
| JP | 2001-14562 A | | 1/2001 |
| JP | 2001014562 A | * | 1/2001 |
| JP | 2002-334382 A | | 11/2002 |
| JP | 2003-21679 A | | 1/2003 |
| JP | 2003-109131 A | | 4/2003 |
| JP | 2003109131 A | * | 4/2003 |
| JP | 2003-132468 A | | 5/2003 |

* cited by examiner signal ratio = 4 : 3 signal ratio = 4 : 1 signal ratio = 4 : 3 signal ratio = 4 : 1

TAG DETECTING SYSTEM, MOVING OBJECT DETECTING METHOD, AND ENTRANCE/EXIT MANAGEMENT SYSTEM

BACKGROUND OF THE INVENTION

1. Field of the Invention

The present invention relates to a tag detecting system for detecting a movement of an object mounting an RFID tag, a moving object detecting method, and an entrance/exit management system which is realized by the moving object detecting method.

2. Description of Related Art

Recently, an RFID tag has been widely used in buried in an IC card, or used in management systems such as an article management system and an entrance/exit management system of persons. Among the RFID tags, particularly, a semi-passive type or an active type of the RFID tag that transmits waves by a cell energy incorporated in the RFID tag, is preferably used in the entrance/exit management system of persons. The semi-passive type or the active type of the RFID tag has a quite ampler communication range (for example, 1 m-10 m) than a passive type of the RFID tag buried in the IC card.

For example, an art of the entrance/exit management system for accurately managing an entrance to and exit from a facility is disclosed. According to the art, the RFID tag that periodically transmits an ID (hereinafter, called an active tag) is used in the management system. Further, according to the art, by relatively shifting directions of mono pole direction antennas arranged at both right and left sides of an entrance/exit gate, if a person having an active tag passes through the gate, entrance and exit directions of the person can be accurately detected by order in which the respective antennas detect the active tag (refer to Japanese Laid-Open Patent Publication No. 2002-334382, paragraphs 0009 to 0015, and FIGS. 1 and 2). Additionally, another art on the entrance/exit management system is disclosed, which detects a position of a person having the RFID tag that transmits an ID (hereinafter, called a semi-passive tag), by arranging infrared transmitters which have different position IDs and antennas which form high frequency magnetic fields at entrance/exit doors, and by receiving signals from the antennas. According to the art, the position of a specific person is determined by the position ID which is transmitted from the respective antennas and the ID of the RFID tag held by the person. Therefore, only the specific person can be discriminated from a plurality of persons having the RFID tags who enter or exit at almost the same time. For example, see Japanese Laid-Open Patent Publication No. 2003-21679 (paragraphs 0009-0015, and FIGS. 1, 2 and 3).

However, a system for detecting the entrance to and the exit from the facility by the active tag, is liable to be influenced by a wave reflector and an obstacle surrounding the system. Further, intensity of a transmitted wave changes by a carrying method of the active tag. These drawbacks reduce accuracy for detecting a position and make the system difficult used outside. Moreover, in case of an infrared transmitter method using the semi-passive tag which can be used outside, the tag needs to be mounted on an outer surface of a person in order to easily receive infrared rays. Hereby, a problem is that the method is liable to be influenced by an external light. In case of a high-frequency magnetic field method, since the transmitting range thereof extends in a spherical shape, a problem is that a tag detection range becomes too broad. As a result, after a person (or an object) having the RFID tag is certified and passes through a gate, if a person having no RFID tag adjacently passes through the gate (so called a piggyback), the conventional method has no means to detect the piggyback because the detection range is unstable or too broad. An art that distinguishes a person having a tag from a person having no tag is needed, which detects the person (object) having the tag in a stable and narrow range by using a radio wave such as a high-frequency magnetic field, so that the piggyback is exactly detected by having a person mount the tag, for example, in a pocket.

SUMMARY OF THE INVENTION

The present invention has been developed from a viewpoint of the above-mentioned problems. It is an object of the present invention to provide a tag detecting system capable of detecting a specific object or person by narrowing a detection area of an RFID tag, a moving object detecting method, and an entrance/exit management system which is realized by the moving object detecting method thereof.

In order to achieve the above-mentioned object, the tag detecting system of the present invention is constructed as follows. The tag detecting system emits pulse code modulated signals which are respectively emitted from first and second generators at such a timing that spaces included in a predetermined part of the pulse code modulated signal emitted by any one of the first and second generators is occupied by the pulse code modulated signal emitted by the other the first and second generators. First and second antennas are adjacently arranged so as to form a cross over area of high-frequency magnetic fields generated by the respective antennas. If the RFID tag is located in the cross over area or a part of the cross over area, the RFID tag is made not to detect the pulse code modulated signals due to the spaces being occupied.

Further, in order to achieve the above-mentioned object, the moving object detecting method of the present invention, is a method for detecting a movement of an object mounting the RFID tag. The method is comprised of: a process that a plurality of trigger antennas respectively form the high-frequency magnetic fields having a cross over area where parts of adjacent magnetic fields are overlaid; a process that the plurality of the trigger antennas emit pulse code modulated signals corresponding to the respective high frequency magnetic fields and generate a cross over trigger signal by overlaying the respective pulse code modulated signals in the cross over area; a process that an integrated circuit mounted on the RFID tag transmits and receives ID information which corresponds to the pulse code modulated signal in the respective high-frequency magnetic fields; and a process that the integrated circuit transmits and receives the corresponding ID information when the integrated circuit detects the cross over trigger signal in the cross over area. Here, the integrated circuit detects the cross over trigger signal in the cross over area based on a size of a ratio between voltage levels of the respective pulse code modulated signals.

Furthermore, in order to achieve the above-mentioned object, the entrance/exit management system of the present invention is a system for monitoring a movement of a person having the RFID tag. The entrance/exit management system includes a plurality of the trigger antennas which respectively form the high-frequency magnetic fields having the cross over area where adjacent magnetic fields are partially overlaid; and the integrated circuit mounted on the RFID tag, detects the respective trigger signals which are included in the magnetic fields of the respective high-frequency magnetic fields, and transmits and receives the ID information that corresponds to the respective trigger signals. Herein, the integrated circuit transmits and receives the ID information in the cross over area only when the integrated circuit detects the cross over trigger signal in which the respective trigger signals contained in the magnetic fields are overlaid. In a preferable embodiment, the trigger signal is a pulse code modulated signal, and the cross over trigger signal is a signal in which the pulse code modulated signals are overlaid so that the time spaces included in a predetermined part of one pulse code modulated signal is occupied by other pulse code modulated signal.

According to the present invention, the tag detecting system capable of detecting the specific object or person by narrowing the detection area of the RFID tag in a simple system construction, the moving object detecting method, and the entrance/exit management system realized by the moving object detecting system thereof, are provided.

BRIEF DESCRIPTION OF THE DRAWINGS

FIG. 17A shows a synchronous bit data in Pattern 1. FIG. 17B shows a synchronous bit data in Pattern 2. FIG. 17C shows a preamble part and a header part in Patterns 1 and 2.

FIG. 19A shows a waveform when a ratio between the trigger signals is 4:3. FIG. 19B shows a waveform when a ratio between the trigger signals is 4:1.

FIG. 20A shows a waveform when a ratio between the trigger signals is 4:3. FIG. 20B shows a waveform when a ratio between the trigger signals is 4:1.

DETAILED DESCRIPTION OF THE PREFERRED EMBODIMENT

Hereinafter, an object detection method and an entrance/exit management system of the most preferable mode for carrying out the present invention (hereinafter, called embodiment) will be explained in reference to drawings. In the following embodiment, an entrance/exit management system for a person will be explained showing preferable examples. First, an outline of the entrance/exit system of the present invention will be explained to be easy to understand the system thereof.

According to the present invention, in the entrance/exit management system including at least RFID tags and antennas, for example, three antennas are adjacently arranged, and parts of respective areas of three high-frequency magnetic fields formed by the high-frequency magnetic fields generated by the antennas are made to be overlaid (interfered). Further, cross over areas, where the respective high-frequency magnetic fields are overlaid, are made to be detection blind areas for the RFID tag by overlaying pulse code modulated signals having different phases. Hereby, a detection area for the RFID tag in the middle high-frequency magnetic field can be narrowed, which is located between the two high frequency magnetic fields at both ends of the three high-frequency magnetic fields. For example, if a width of the detection area in the middle high-frequency magnetic field is made to be about 50 cm by arranging the cross over areas, which are the detection blind areas, it is possible to detect only a person having the RFID tag.

Figure 1:
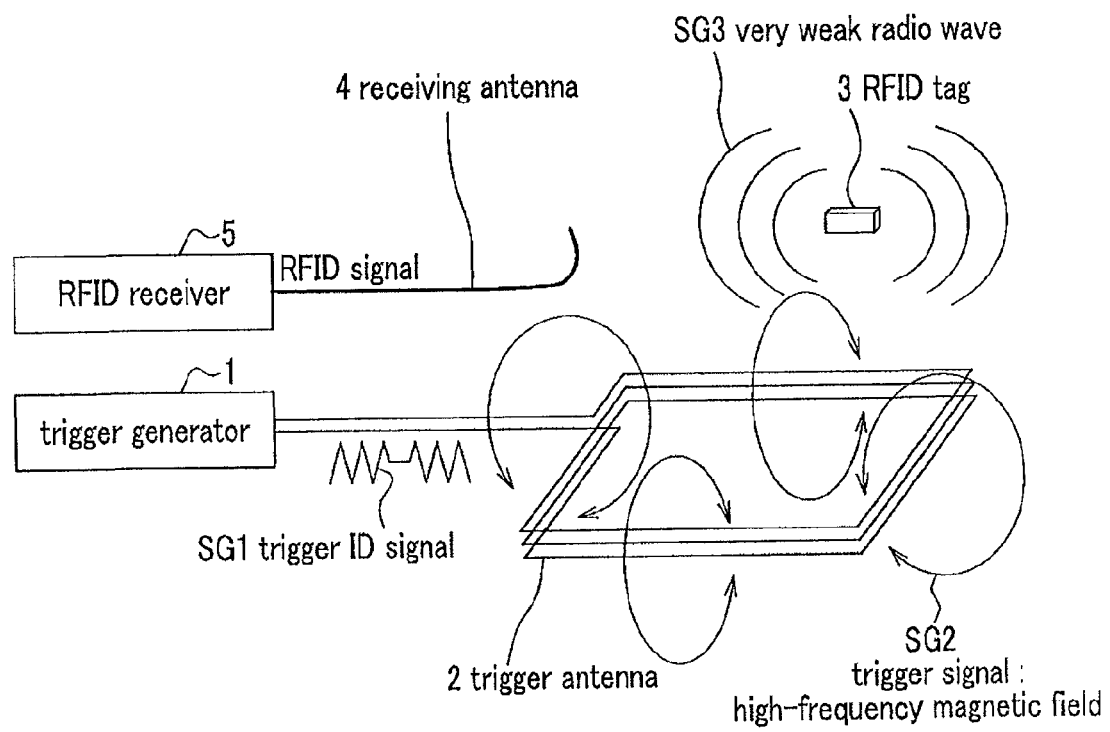
FIG. 1 is a basic construction diagram showing a construction of an entrance/exit system of the present invention.

FIG. 1 is a basic construction diagram showing a construction of the entrance/exit management system of the present invention. This entrance/exit management system is an active type of the RFID tag system using a very weak current. The system compromises a trigger generator 1 generating a trigger ID signal SG1, a coil shaped trigger antenna 2 generating a high-frequency magnetic field SG2 based on a trigger ID signal emitted from the trigger generator 1, an RFID tag 3 transmitting a very weak radio wave SG3 by a cell energy incorporated in the RFID tag 3 based on the trigger ID signal SG1 which is included in the high-frequency magnetic field SG2 generated by the trigger antenna 2, and a ½λ length dipole antenna. Further, the system comprises a receiving antenna 4 which receiver the very weak radio wave SG3 from the RFID tag 3, an RFID receiver 5 which extracts ID data from the very weak radio wave SG3 of the RFID tag 3 and transmits the ID data to a host device not shown in FIG. 1. Herein, the trigger antenna 2, for example, is composed of a square shaped loop antenna with a side length of 1 m or a circle shaped loop antenna with a diameter of 1 m.

Next, a performance outline of the RFID tag system shown in FIG. 1 will be explained. If a high-frequency electric current modulated by the trigger ID signal SG1 is transmitted from the trigger generator 1 to the trigger antenna 2, the trigger antenna 2 generates the high-frequency magnetic field SG2 around the trigger antenna 2 based on the trigger ID signal SG1. Then, the RFID tag 3 receives the trigger ID signal SG1 by being exposed to the high-frequency magnetic field SG2 with a sufficient intensity. The RFID tag 3 extracts a trigger ID from the trigger ID signal SG1, encodes a composite signal composed by an inherent tag ID of the RFID tag 3 and the extracted trigger ID to ID data by modulating the signal, and transmits the ID data as a very weak radio wave SG3.

An RFID receiver 5 receives the very weak radio wave SG3 containing the ID information through a receiving antenna 4, decodes the signal of the very weak radio wave SG3 containing the encoded ID information, and decomposes data of the signal to the inherent tag ID and trigger ID of the RFID tag 3. After that, the RFID receiver 5 transmits the data of the tag ID and the trigger ID together with time information thereof, to a host system (not shown). By reading out the data, the host system acquires the ID data (that is, the trigger ID and the tag ID) of the RFID tag 3 which is exposed to the high-frequency magnetic field generated by the trigger antenna 2 together with the time information.

Next, a method for controlling a receiving area of the trigger ID signal SG1 will be explained, which is performed by a combination of the trigger generator 1 and the trigger antenna 2 shown in FIG. 1. That is, by using the trigger antenna 2 in single or plural, it is possible to control the receiving area of the trigger ID signal SG1. Hereinafter, a mechanism thereof will be explained.

Figure 2:
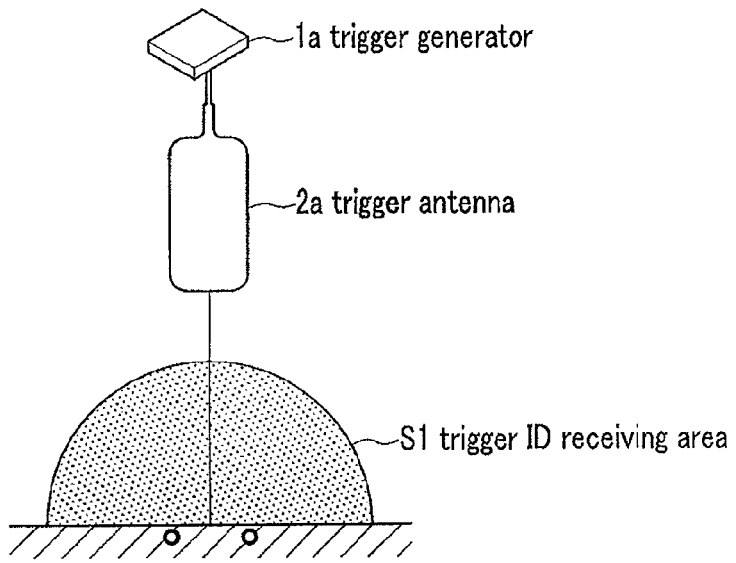
FIG. 2 is a conceptual diagram showing that a trigger antenna covers a single trigger ID receiving area in an RFID tag system shown in FIG. 1.

FIG. 2 is a conceptual diagram showing that a trigger antenna covers a single trigger ID receiving area in the RFID tag system shown in FIG. 1. In this case, a single trigger ID receiving area S1 is formed by a pair of a trigger generator 1a and a trigger antenna 2a.

Figure 3:
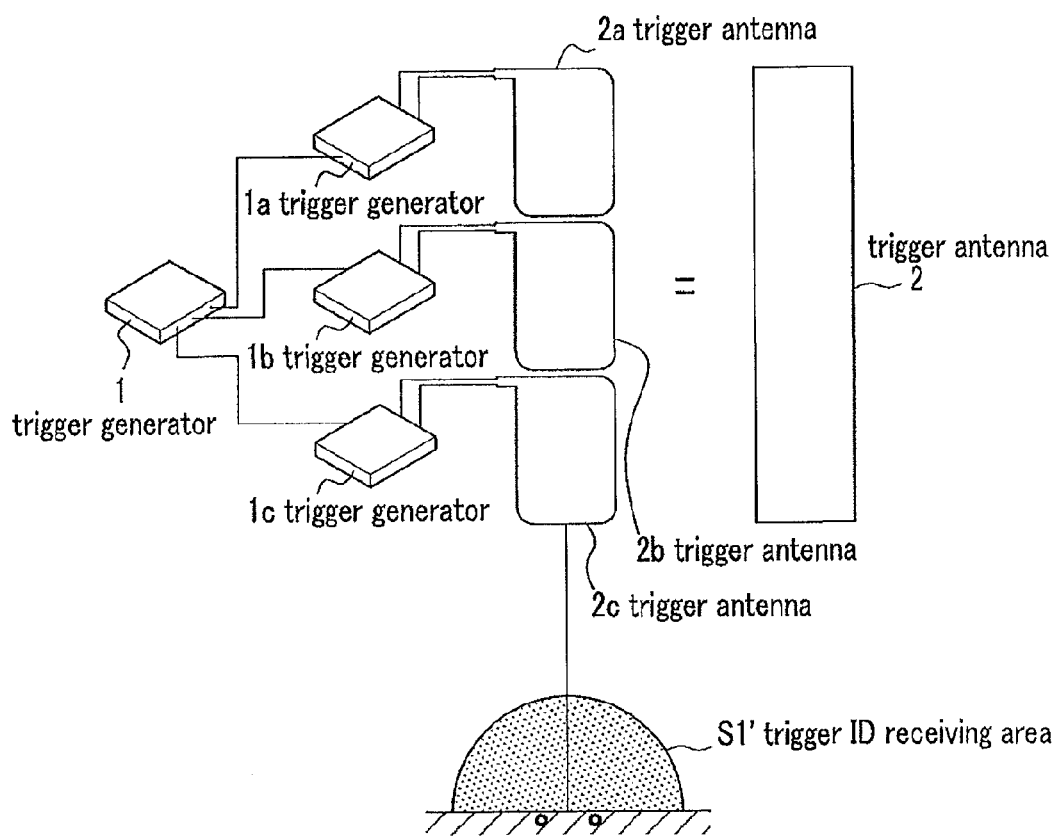
FIG. 3 is a conceptual diagram showing that a plurality of trigger antennas cover a single trigger ID receiving area in the RFID tag system shown in FIG. 1.

FIG. 3 is a conceptual diagram showing that a plurality of trigger antennas cover a single trigger ID receiving area S1'. In this case, a logical single trigger antenna 2 is virtually formed, by combining a plurality of trigger generators and trigger antennas such as the trigger generator 1a and the trigger antenna 2a, a trigger generator 1b and a trigger antenna 2b, and a trigger generator 1c and a trigger antenna 2c. Here, the respective trigger antennas 2a, 2b and 2c generate the respective trigger ID signals by identical signals or synchronous signals synchronized each other. Hereby, the single trigger ID receiving area S1' is formed as an extended trigger area having a strong magnetic field.

Figure 4:
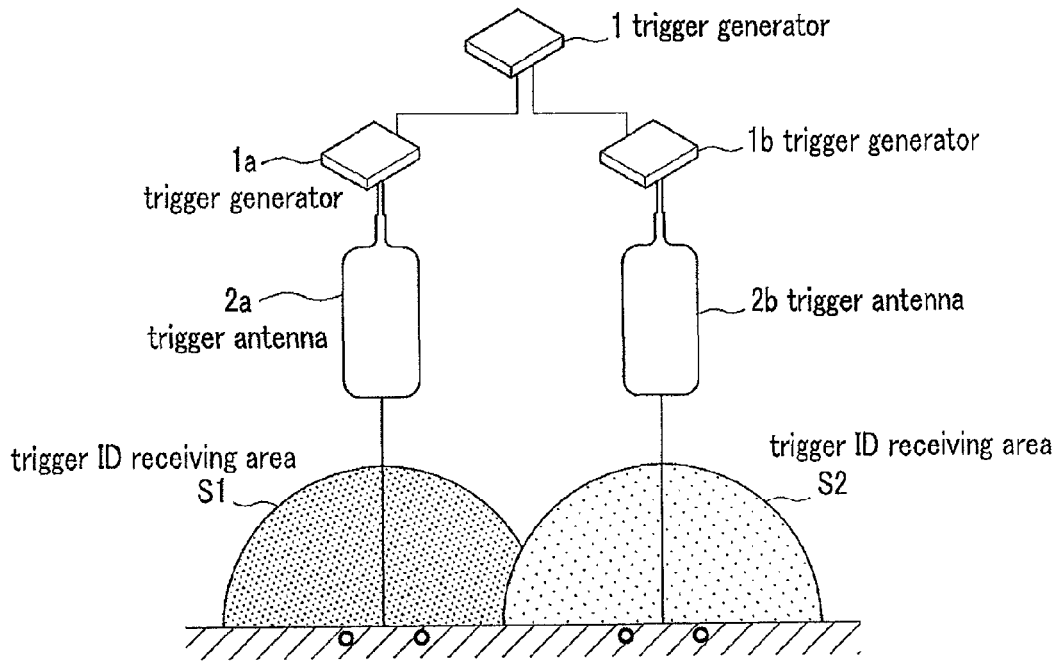
FIG. 4 is a conceptual diagram showing that two trigger antennas form trigger ID receiving areas for detecting a passing direction of an object in the RFID tag system shown in FIG. 1.

FIG. 4 is a conceptual diagram showing that two trigger antennas form trigger ID receiving areas for detecting a passing direction of a person or an object. In this case, two trigger generators 1a and 1b (first and second generators) and two trigger antennas 2a and 2b (first and second antennas) form respective trigger ID receiving areas S1 and S2. Here, a size of the ID receiving area is finite. Both ID receiving areas S1 and S2 are formed at different positions by shifting the positions of the trigger antennas 2a and 2b (by adjoining the positions). Hereby, the passing direction whether a person or an object passes from the trigger ID receiving area S1 to the trigger ID receiving area S2, or the person or object passes from the trigger ID receiving area S2 to the trigger ID receiving area S1, can be detected. Herein, if the number of the pair of trigger generator and trigger antenna is increased, for example, to three or four, three or four pairs of the trigger ID receiving areas may be formed.

Figure 5:
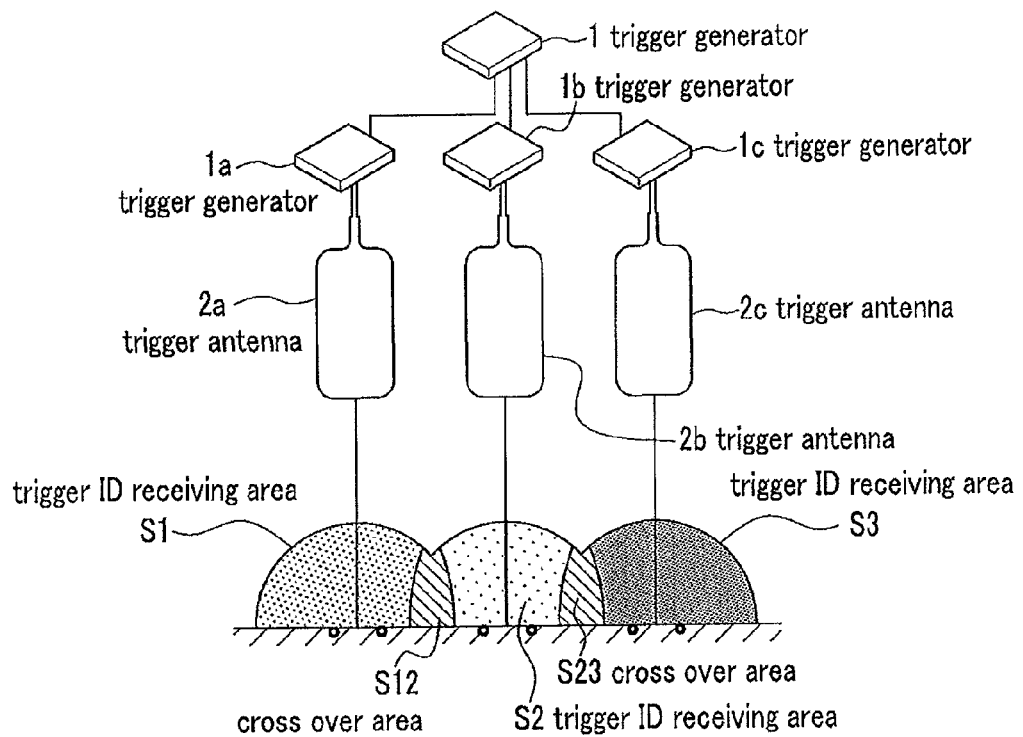
FIG. 5 is a conceptual diagram showing a case that three trigger antennas restrict a trigger ID receiving area in the RFID tag system shown in FIG. 1.

FIG. 5 is a conceptual diagram showing that tree trigger antennas restrict a trigger ID receiving area in the RFID tag system shown in FIG. 1. In this case, three trigger ID receiving areas S1, S2, and S3 are formed by three pairs of trigger generators 1a, 1b, and 1c (first, second, and third generators) and the trigger antennas 2a, 2b, and 2c (first, second, and third antennas). This formation can restrict a detection area of the high-frequency magnetic field in the trigger ID receiving area S2 positioned in the middle between the areas S1 and S2. That is, by arranging the trigger antennas 2a and 2c at both sides of the trigger antenna 2b located in the middle, it is possible to make cross over areas S12 and S23, where the adjacent trigger ID receiving areas are overlaid (first and second cross over areas), become detection blind areas. Hereby, it is possible to restrict the detection area as narrowing the detection area of the high-frequency magnetic field in the trigger ID receiving area S2 which is formed by the trigger antenna 2b located in the middle between the trigger antennas 2a and 2c (that is, making the trigger ID signals at the cross over areas interfere each other (occupying spaces each other)).

In this way, a variety of trigger ID receiving areas can be formed by construction of the trigger generators and the trigger antennas. Here, in the embodiment of the present invention, by combining a plurality (two and more) of the trigger generators and the trigger antennas, and by making the cross over areas where adjacent trigger ID receiving areas are overlaid become the detection blind areas of the high-frequency magnetic fields, a function to restrict the detection area of the high frequency magnetic field is realized, in the trigger ID receiving area located in the middle position. Hereinafter, in a case of three pairs of the trigger generators and trigger antennas, specific embodiments on restriction of the trigger ID receiving area will be explained in detail.

First Embodiment

First, in reference to FIG. 1 mentioned hereinbefore, a process that a three-dimensional coil (3D coil) incorporated in the RFID tag 3 detects a three-dimensional high frequency magnetic field which is generated in directions of X, Y, and Z, and a receiving area in a high-frequency magnetic field is restricted will be explained. If the trigger generator 1 generates a pulse code modulated signal by an OOK method (On-Off-Keying: two values modulation method) or an ASK method (Amplitude Shift Keying: amplitude shift modulation method), the trigger antenna 2 generates a high-frequency magnetic field SG2 containing a pulse code modulated signal. Here, if a plurality of the trigger generators 1 and trigger antennas 2 are adjacently arranged, not shown in FIG. 1, the high-frequency magnetic field SG2 having a cross over area in which high-frequency magnetic fields are overlaid, is generated (see FIG. 5).

Figure 6:
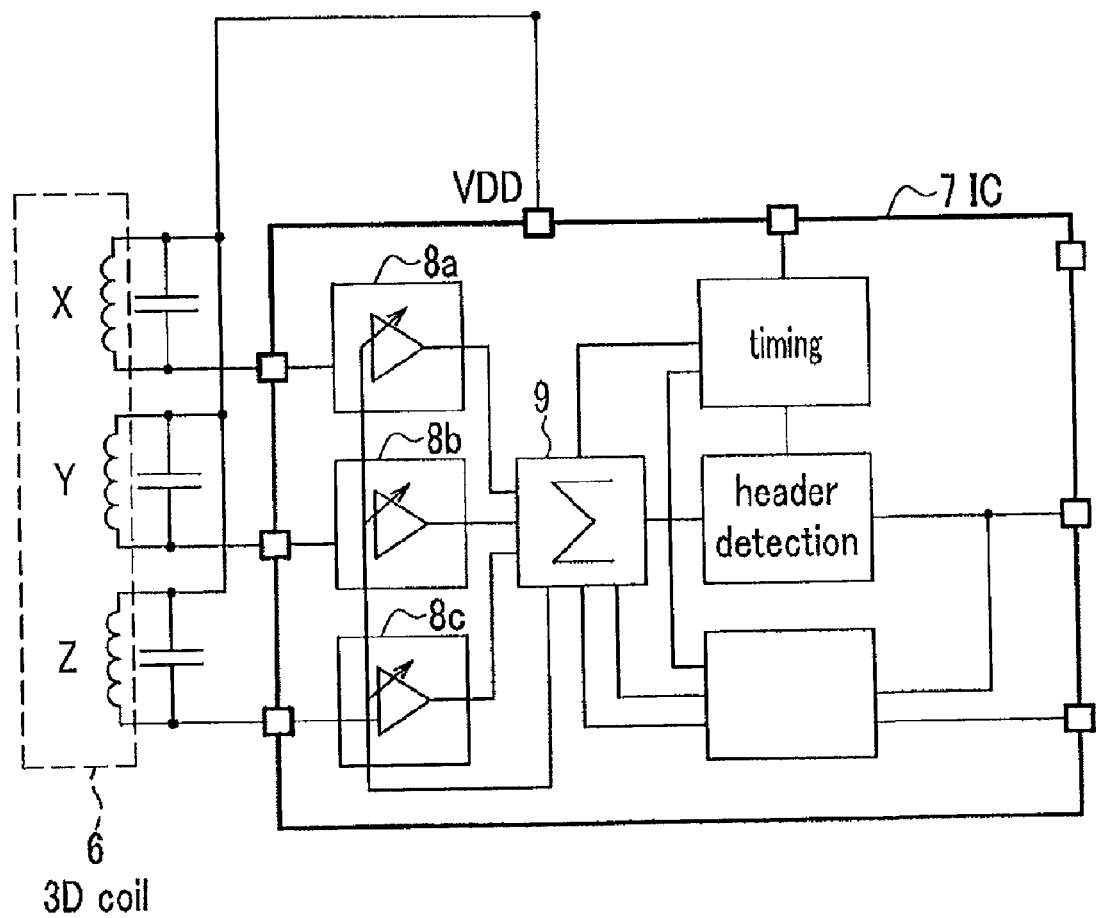
FIG. 6 is a block diagram showing a construction of a 3D coil and an exclusive integrated circuit (IC) mounted on the RFID tag.

On the other hand, the RFID tag 3 detects the high-frequency magnetic field SG2 by the 3D coil and an exclusive integrated circuit (IC) in FIG. 6. Then, the RFID tag 3 transmits ID data showing which area of the high-frequency magnetic field excites the RFID tag 3, to the receiving antenna 4 by a very weak radio wave SG3. An RFID receiver 5 receives a signal of the ID data contained in the very weak radio wave SG3 transmitted from the RFID tag 3, deletes an error code from the ID data, and transmits the resulting ID data with adding time information to a host device not shown.

Here, the RFID tag 3 detects three-dimensional vector components in X, Y, Z directions of the high-frequency magnetic field generated by the 3D coil and the exclusive IC of the trigger antenna 2 in FIG. 6, as scalar components. FIG. 6 is a configuration diagram of the exclusive integrated circuit (IC) mounted in the RFID tag 3. In reference to the diagram, performance that the 3D coil and the exclusive IC detect the three-dimensional vector components of the high-frequency magnetic field as scalar components, will be explained.

In general, the high-frequency magnetic field generated by the trigger antenna 2 composed of a loop coil is generated surrounding coils of the loop coil and being formed in a doughnut-shape. On the other hand, in the RFID tag 3 of the present embodiment, a 3D coil 6 for detecting the three-dimensional magnetic field in X, Y, and Z directions is incorporated. The 3D coil 6 detects magnetic fields of the respective components in the X, Y, and Z directions at a point around each coil as voltage intensity with polarity (that is, vector value). An exclusive IC 7 composes a vector value of each voltage by a composer 9 and inputs the value as a scalar value, after the IC 7 inputs the vector value in X, Y, and Z directions and amplifies the vector value by respective auto gain control amplifiers 8a, 8b and 8c. Hereby, the IC 7 inputs a pulse signal with a constant peak voltage and a predetermined timing.

Here, if sizes of the magnetic field in the X, Y, Z directions are denoted by Hx, Hy, and Hz, and a voltage converting a coefficient of X, Y, and Z of the 3D coil 6 is denoted by Kx, a gain of the auto gain control amplifiers 8a, 8b and 8c is denoted by Av, and an output signal voltage of the IC 7 is donated by Vo, a size of the output signal voltage Vo is calculated approximately in the following equation (1).

$$Vo = Av(|Kx \times Hx| + |Ky \times Hy| + |Kz \times HZ|) \quad (1)$$

Here, when the size of the magnetic field is over the predetermined level, a size of the output signal voltage Vo comes to almost a power supply voltage VDD.

Next, a method for restricting the receiving area in the high-frequency magnetic field, which is an advantageous feature of the present invention, will be explained by examples in reference to drawings. The high-frequency magnetic fields which are mutually overlaid and interfered each other, when pulse code modulated signals of the high-frequency magnetic fields are overlaid, emit pulse code modulated signals in which spaces of the signals are occupied each other. Here, in a part of an area where respective field strengths of the magnetic fields are close, which is in a cross over area where the high-frequency magnetic fields are overlaid, spaces of one pulse code modulated signal are occupied by the other pulse code modulated signal in close voltage levels each other. Hereby, an exclusive IC 7 can not detect the pulse code modulated signals. That is, this area (cross over area where the field strength of the magnetic fields are close in the cross over area where the high-frequency magnetic fields are overlaid) becomes an invalid area incapable of being detected (detection blind area), even though the area is in the high-frequency magnetic fields. Accordingly, a detection area capable of being detected can be restricted, which is in the high-frequency magnetic field generated by a coil of the trigger antenna 2. Herein, as a method for occupying the spaces of the signals each other as mentioned above, there is a method of shifting transmission timing of the pulse code modulated signals of the respective trigger generators 1.

Figure 7:
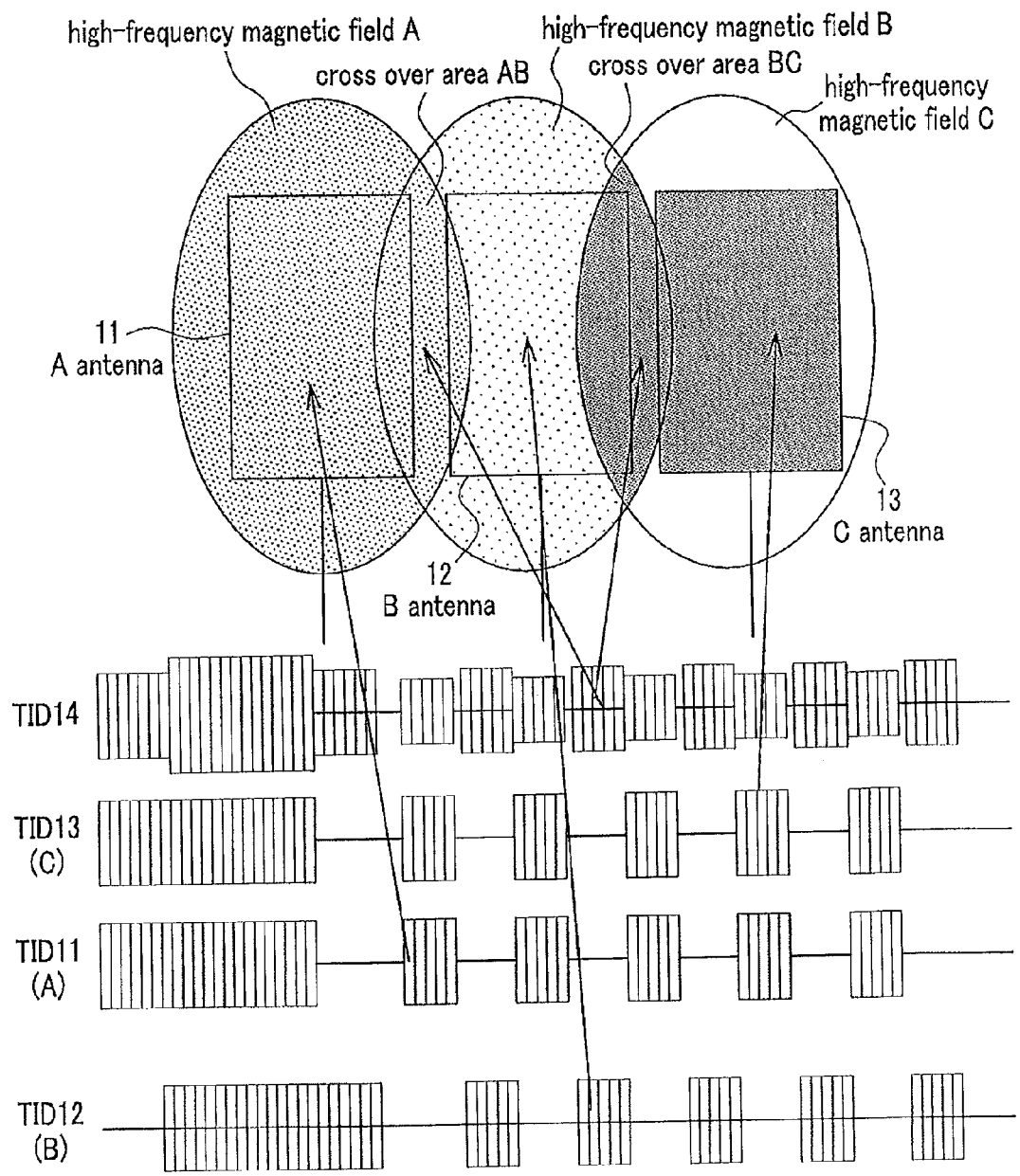
FIG. 7 is a conceptual diagram showing a mechanism that three trigger antennas restrict an area of the high-frequency magnetic field in an entrance/exit management system of the first embodiment of the present invention.

Next, a restricting method for restricting the detection area capable of being detected will be specifically explained in reference to drawings. FIG. 7 is a conceptual diagram showing an area restricting mechanism of the high-frequency magnetic fields performed by the three trigger antennas, according to the entrance/exit management system in the first embodiment of the present invention. In FIG. 7, a high-frequency magnetic field A generated by an A antenna 11, a high-frequency magnetic field B generated by a B antenna 12, and a high-frequency magnetic field C generated by a C antenna 13 mutually interference each other by overlaying parts of the areas. Hereby, a cross over area AB and a cross over area BC are formed on both sides of the high-frequency magnetic field B.

On the other hand, a C antenna 13 emits a pulse code modulated signal TID 13 to the high-frequency magnetic field C. The A antenna 11 emits a pulse code modulated signal TID 11 to the high-frequency magnetic field A. Here, the pulse code modulated signal TID 13 and the pulse code modulated signal TID 11 are emitted as the same phase signals to the respective high-frequency magnetic fields A and C. Further, the B antenna 12 located in the middle between the antennas A 11 and C 13 emits a pulse code modulated signal TID 12 to the high-frequency magnetic field B. The phase of the pulse code modulated signal TID 12 is shifted at 180° against the pulse code modulated signals TID 13 and TID 11. That is, the pulse code modulated signal TID 12 becomes a timing signal in a time interval in which there are no pulse code modulated signals TID 13 and TID 11.

Hereby, a cross over trigger signal TID 14 in which a cross over area AB where the high-frequency magnetic field A of the A antenna 11 and the high-frequency magnetic field B of the B antenna 12 are overlaid, and a cross over area BC in which the high-frequency magnetic field B of the B antenna 12 and the high-frequency magnetic field C of the C antenna 13, are overlaid, becomes a sequential signal and does not become an OOK signal. Accordingly, an IC in the RFID tag 3 can not detect the signal as a pulse code modulated signal. Thus, the high-frequency magnetic field B of the B antenna 12 can restrict the detection area of the high-frequency magnetic field of the B antenna 12 by narrowing the detection area because the cross over area AB and the cross over area BC become an area where the high-frequency magnetic field is incapable of being detected (detection blind area).

Hereby, it is possible do detect whether a person having the RFID tag 3 is going to a direction of A→B→C (for example, a direction to an entrance) or is going to a direction of C→B→A (for example, a direction to an exit). Further, when the person passes through a narrow detection area in the high-frequency magnetic field B (that is, the detection area=the area B−the cross over area AB−the cross over area BC), only the RFID tag 3 held by the person is detected. Therefore, even though a plurality of persons are moving closely, only a specific person can be detected. That is, it is possible to check the entrance/exit for preventing a piggyback in the narrow detection area of the high-frequency magnetic field B (the detection area=the area B−the area AB−the area BC).

Second Embodiment

Figure 8:
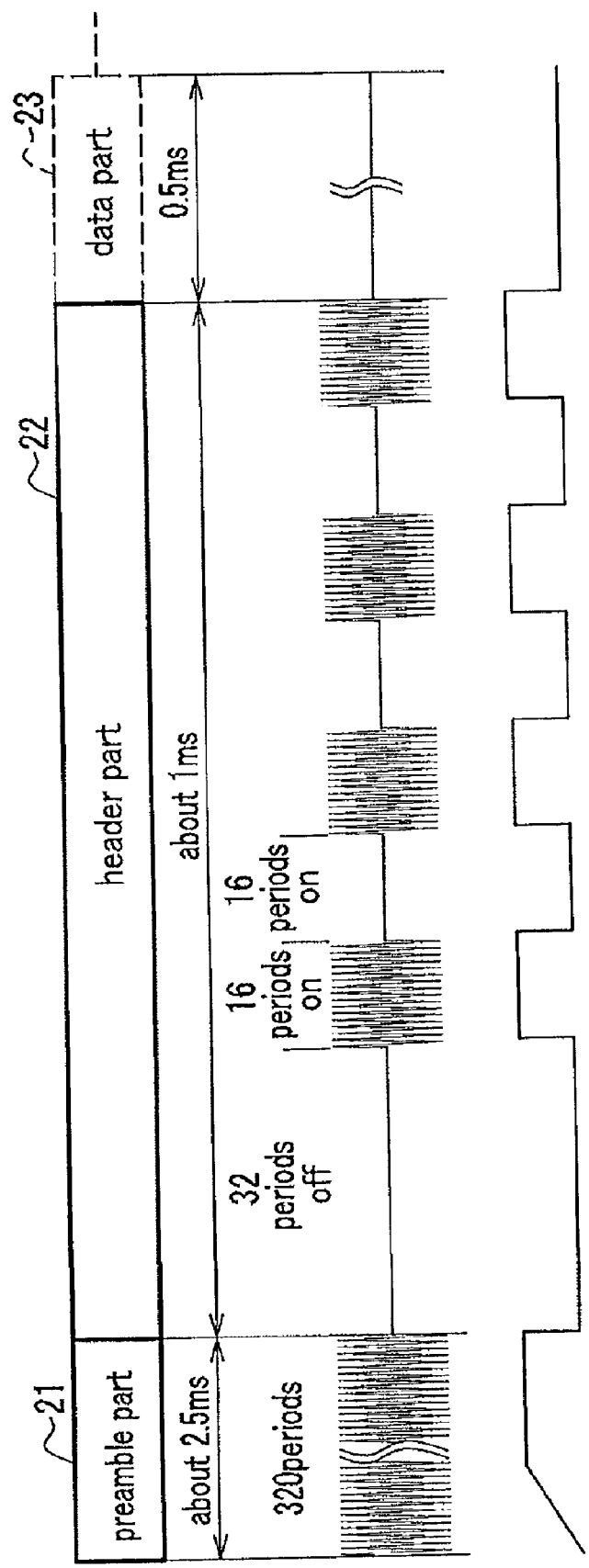
FIG. 8 is a model diagram showing a pulse code modulated signal used in the entrance/exit management system of the present invention.

FIG. 8 is a model diagram showing a pulse code modulated signal used for the entrance/exit management system of the present invention. As shown in FIG. 8, a trigger ID signal of the high-frequency magnetic field emitted from the trigger antenna 2 in FIG. 1 to the RFID tag 3 in the high-frequency magnetic field (that is, a pulse code modulated signal) includes a preamble part 21 which is a continuous wave in a definite period, a succeeding header part 22, and a data part 23. If the IC 7 in the RFID tag 3 detects the trigger signal by the preamble part 21, the IC 7 starts to prepare for receiving the data part 23. Then, if the RFID tag 3 confirms the header part 22 followed by the preamble part 21, the RFID tag 3 starts to receive the succeeding trigger signal as a data part. In other words, the IC 7 in the RFID tag 3, can output an amplitude modulated magnetic field as a change in a voltage. Further, the IC 7 has a function capable of outputting only the data which includes a signal changing in a definite regulation, based on the voltage (that is, signals such as a preamble pattern and a header pattern in a digital signal communication).

Therefore, the IC 7 in the RFID tag 3 can not receive the data part 23, if the header part 22 is not detected as an expected pulse signal. Further, if the IC 7 receives the data part 23, since a CRC (Cyclic Redundancy Checking) detects an error signal, the data part 23 is deleted. Eventually, an advantage that the IC 7 in the RFID tag 3 has the above-mentioned features makes it possible to realize the narrow detection area in the high-frequency magnetic field.

That is, as shown in FIG. 7 explained in the above mentioned first embodiment, if a cross over area where pulse code modulated signals of adjacent two high-frequency magnetic fields are overlaid, signals of the preamble part and the succeeding header part of the two pulse code modulated signals (predetermined part of the pulse code modulated signal) are overlaid. As a result, a preamble pattern and a header pattern in the cross over area in the high-frequency magnetic fields are no more normal patterns. That is, in the cross over area in the high-frequency magnetic fields, since the preamble part and the header part are destroyed, it is possible to make the cross over area become the detection blind area, similarly to the first embodiment.

However, if pulse levels (voltage levels) of the two cross over pulse code modulated signals are different, there are two cases that the IC 7 in the RFID tag 3 detects or does not detect the preamble part and the header part as normal parts, by a size of a ratio between signal levels of the two pulse code modulated signals. If the ratio between the signal levels of the two pulse code modulated signals is large, the IC 7 detects a signal formed of a difference between the two pulse code modulated signals, as the preamble part and the header part of a normal pulse code modulated signal. On the other hand, if the ratio between the signal levels of the two pulse code modulated signals is small, since the IC 7 can not detect a signal formed of a difference between the two pulse code modulated signals as an ON/OFF signal (OOK signal), the IC 7 does not detect the signal as the preamble part and the header part of a normal pulse code modulated signal.

Figure 9:
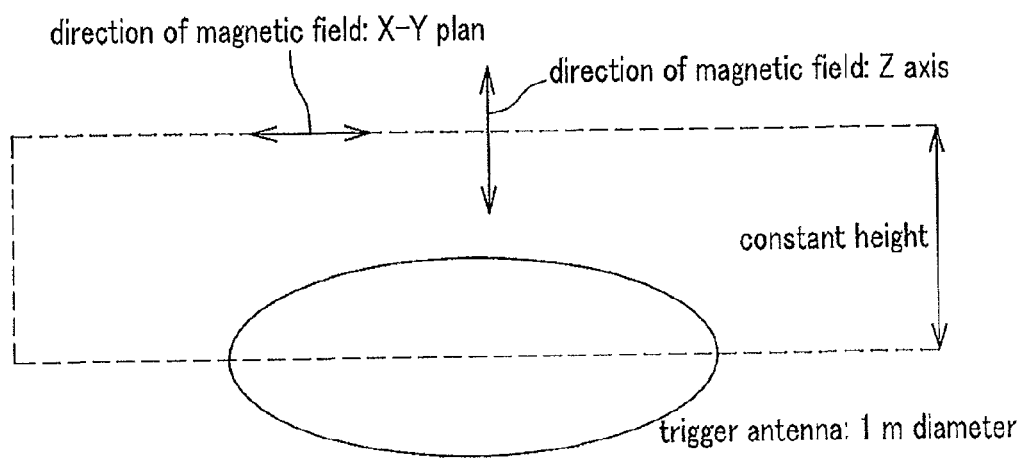
FIG. 9 is a diagram showing directions of a magnetic field at the predetermined height which is generated by a loop shaped trigger antenna.

Next, a mechanism why the preamble part and the header part are detected or not in association with the size of the ratio between the signal levels of the two cross over pulse code modulated signals will be explained in detail. First, a pattern of the high-frequency magnetic field of the trigger antenna detected by a 3D coil 6 functioning as a magnetic field detection coil (see FIG. 6) will be explained. FIG. 9 is an explanatory diagram showing a direction of a magnetic field at a predetermined height in the high-frequency magnetic field generated by the loop shaped trigger antenna. FIG. 9 shows a direction of a magnetic field Hx in a horizontal direction (x axis direction) and a direction of a magnetic field Hz in a vertical direction (z axis direction) at a definite height such as 1 m, with respect to the trigger antenna with a diameter of 1 m. That is, FIG. 9 shows the direction of the magnetic field detected by the 3D coil.

Figure 10:
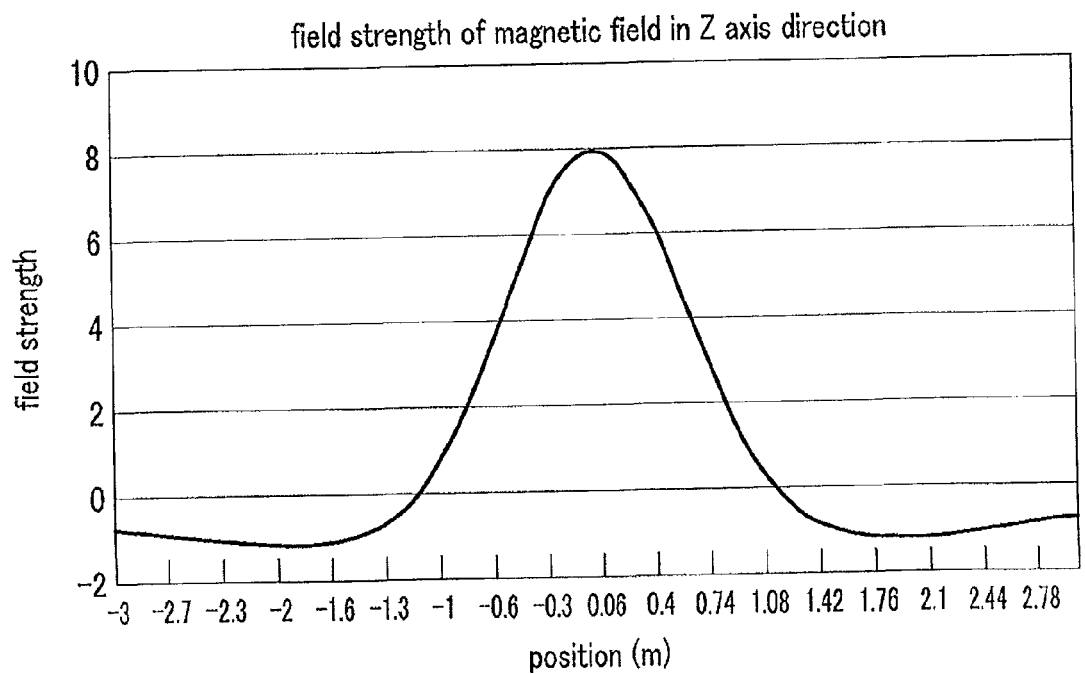
FIG. 10 is a graph showing a field strength of a magnetic field Hz in a vertical direction (Z axis direction) detected by the 3D coil at the detecting position in FIG. 9.

FIG. 10 is a characteristic diagram showing a field strength of the magnetic field Hz in a vertical direction (z axis direction) detected by the 3D coil at the detecting position shown in FIG. 9. The abscissa indicates a distance from a center of the trigger antenna and the ordinate indicates the field strength of the magnetic field. Here, the strength of the magnetic field detected by the 3D coil in the vertical direction (z axis direction) at a height of 1 m, comes to be maximum at the center of the trigger antenna as shown in FIG. 10, and comes to be minimum at ends the coil (at a 0.5 m position from the center) on both sides of the trigger antenna.

Figure 11:
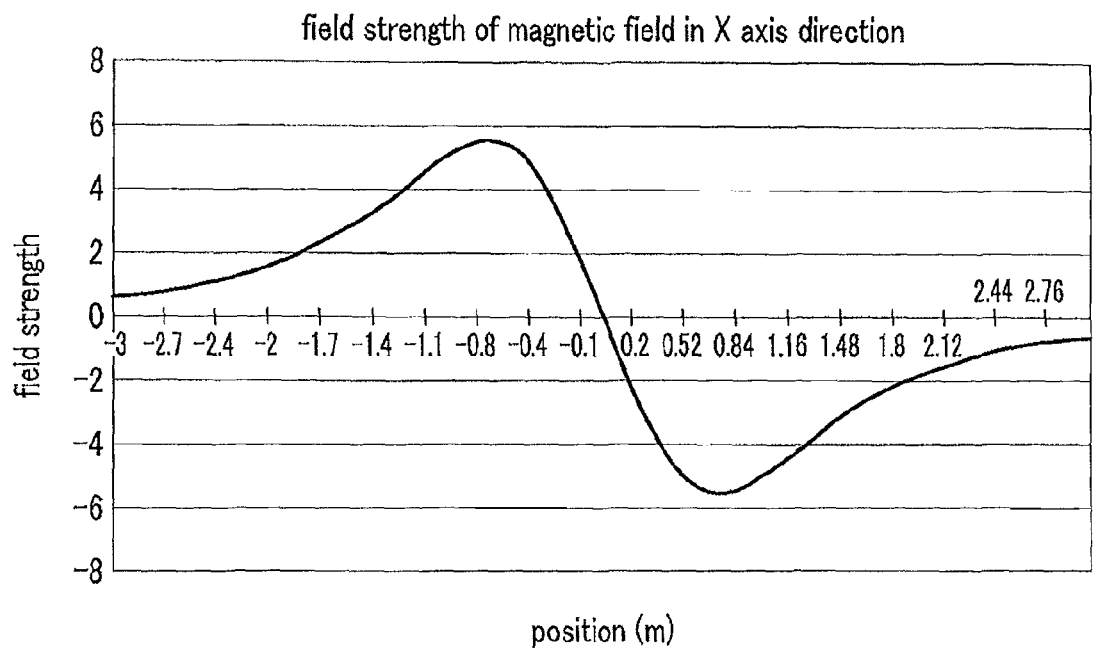
FIG. 11 is a graph showing a field strength of a magnetic field Hx in a horizontal direction (X axis direction) detected by the 3D coil at the detecting position in FIG. 9.

FIG. 11 is a characteristic diagram showing a field strength of the magnetic field Hx in a horizontal direction (X axis direction) detected by the 3D coil at the detecting position shown in FIG. 9. The abscissa indicates a distance from the center of the trigger antenna and the ordinate indicates a field strength of the magnetic field. Here, the field strength of the magnetic field detected by the 3D coil in the horizontal direction (X axis direction) at a height of 1 m, comes to be minimum at the center of the trigger antenna as shown in FIG. 11, and comes to be maximum at the ends of the coil (at 0.5 m position from the center) on both sides of the trigger antenna.

Figure 12:
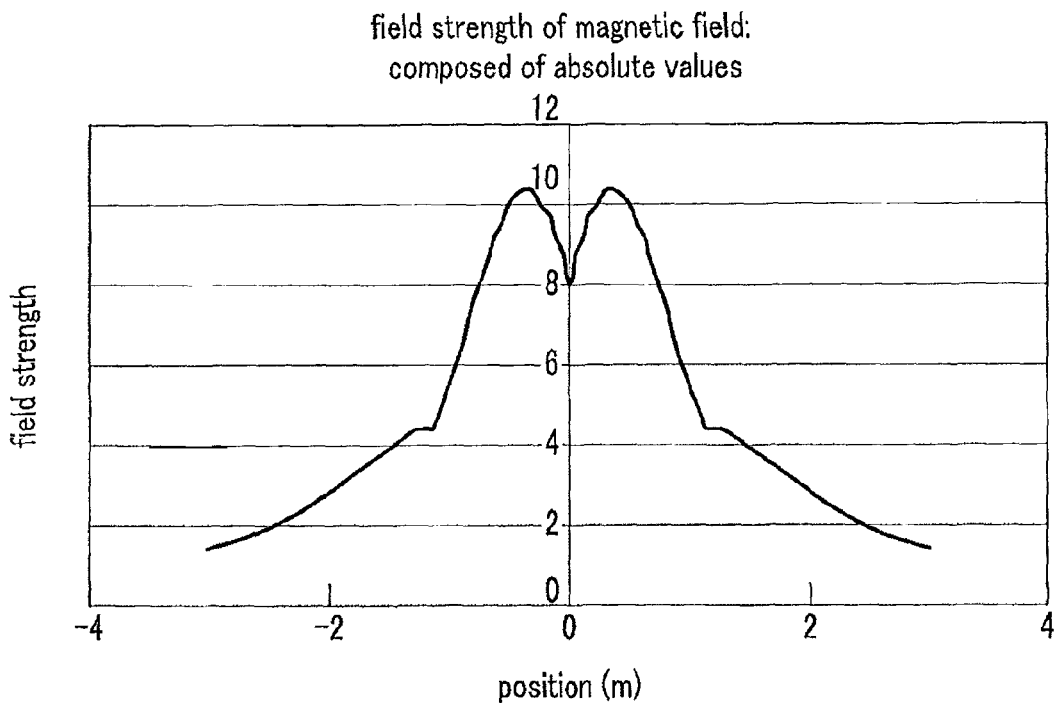
FIG. 12 is a graph showing a field strength of a composite magnetic field detected by the 3D coil at the detecting position in FIG. 9.

Usually, if the RFID tag passes through in a direction vertical to the X axis, the direction is parallel to the Y axis. Thus, a component of the Y axis Hy in the high-frequency magnetic field is 0, that is, negligible. Therefore, the high-frequency magnetic field detected by the 3D coil is represented by the two magnetic fields: the magnetic field Hx in the horizontal direction (X axis direction) and the magnetic field in the vertical direction Hz (z axis direction). If an absolute value of the magnetic field Hx in the horizontal direction (x axis direction) shown in FIG. 11 and an absolute value of the magnetic field Hz in the vertical direction (Z axis direction) shown in FIG. 10 are composed as a scalar value, a property of the magnetic field is represented as shown in FIG. 12. FIG. 12 is a characteristic diagram showing a field strength of a composite magnetic field detected by the 3D coil at the measuring position in FIG. 9. Herein, the abscissa indicates a distance from the center of the trigger antenna, and the ordinate indicates the field strength of the magnetic field.

Figure 13:
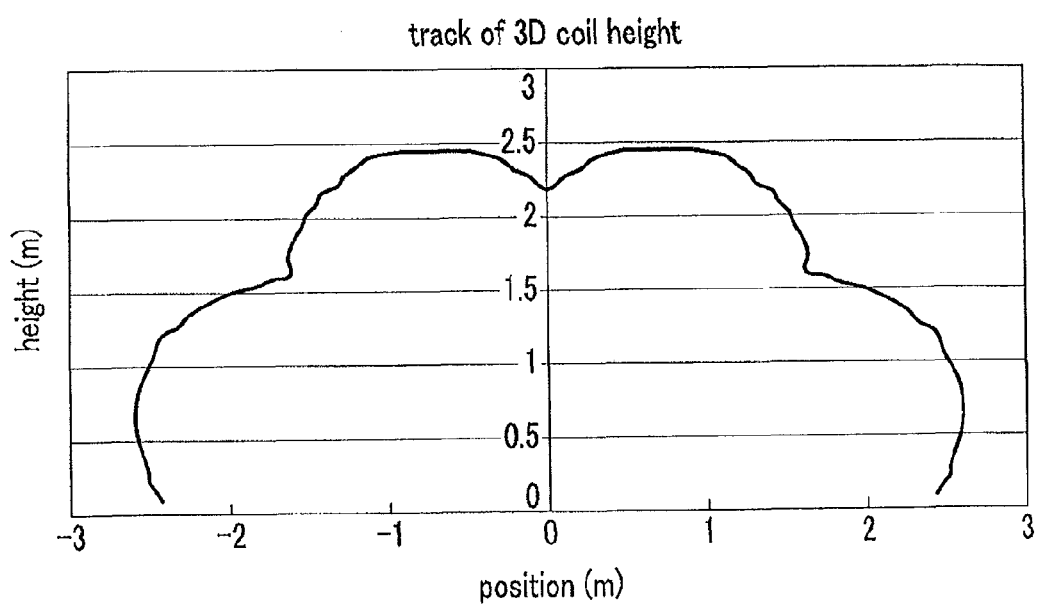
FIG. 13 is a graph showing a track of the 3D coil height in the X axis direction when a field strength of the magnetic field detected by the 3D coil is definite.

Here, if the RFID tag moves in level 2 based on the property of the field strength of the composite magnetic field detected by the 3D coil shown in FIG. 12, a movement track of the RFID tag in the X axis direction is shown by a graph in FIG. 13. FIG. 13 is a characteristic graph showing the field strength of the magnetic field detected by the 3D coil in the X axis direction. Herein, the abscissa indicates a distance from the center of the trigger antenna, and the ordinate indicates a height from the trigger antenna. Although a pattern of the field strength of the magnetic field is distorted, a whole shape is almost close to a spherical shape. Therefore, if the high-frequency magnetic field of the trigger antenna is detected by the 3D coil in the RFID tag, an almost spherical shape of the field strength of the magnetic field can be detected as shown in FIG. 13.

Based on a premise that a magnetic field in any three-dimensional directions can be equally detected by using the 3 D coil, a mechanism that the preamble part and the header part are detected or not detected in accordance with the size of the ratio between the signal levels of the two cross over pulse code modulated signals will be explained. As mentioned before, the mechanism is a feature of the present embodiment. According to the embodiment, if the ratio of the signal levels between the two pulse code modulated signals in the cross over area of the reciprocal magnetic fields is in a definite range, by interference between the magnetic fields of two and more high-frequency magnetic fields, neither of the pulse code modulated signals is detected. If the ratio of the signal levels between the pulse code modulated signals is over the definite range, the pulse code modulated signal in a higher signal level is detected.

Figure 14:
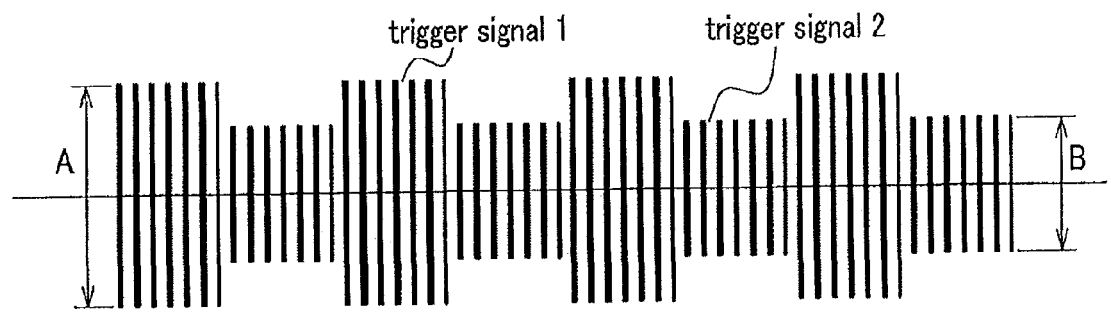
FIG. 14 shows a composite pulse code modulated signal generated so that two pulse code modulated signals are overlaid to mutually occupy spaces one another.

FIG. 14 shows a composite pulse code modulated signal composed of the two pulse code modulated signals, which are overlaid so that spaces of one high-frequency magnetic field are occupied by the other high-frequency magnetic field. The IC of the RFID tag 3 of the present embodiment has a mechanism of detecting a pulse code modulated signal having a larger level of a ratio, if the ratio (A/B or B/A) between the two pulse code modulated signals (trigger signal 1 and trigger signal 2) exceeds a definite value as shown in FIG. 14.

Figure 15:
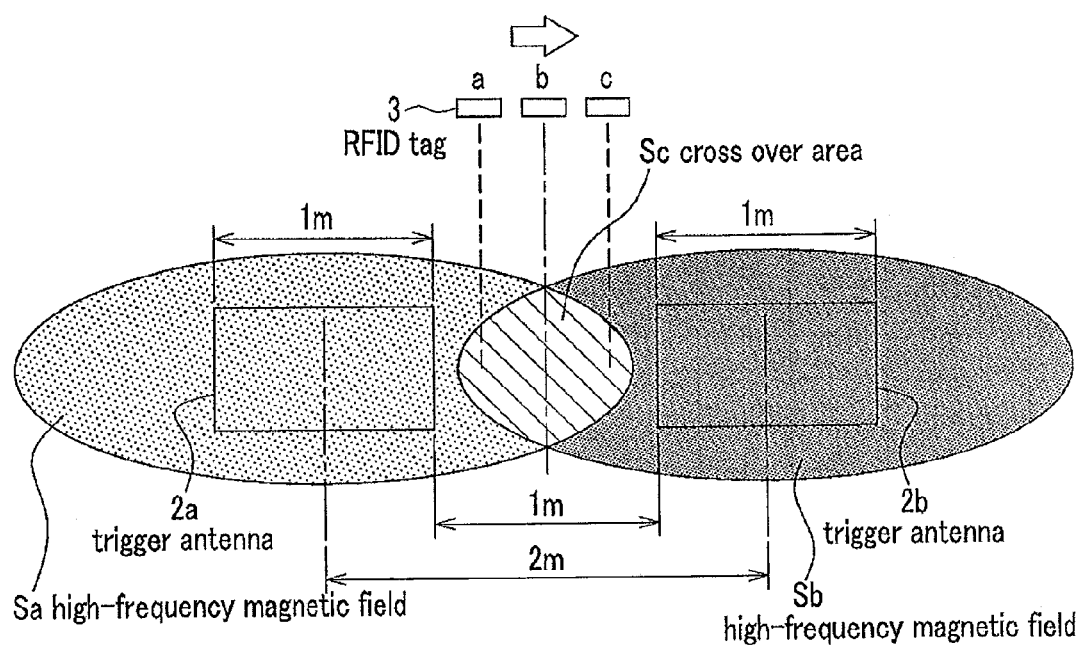
FIG. 15 is a conceptual diagram showing a state that the RFID tag passes through two high-frequency magnetic fields which are formed by two trigger antennas.

FIG. 15 is a conceptual diagram showing a state that the RFID tag 3 passes through the two high-frequency magnetic fields formed by the two trigger antennas. If the trigger antennas having a long side of 1 m are arranged at a 2 m distance in a center spacing, respective high-frequency magnetic fields 2a and 2b are formed by the respective trigger antennas 2a and 2b. Here, a cross over area Sc is formed. Here, the RFID tag 3 passes in a direction of an arrow shown in FIG. 15, at a 1 m height from a surface of the trigger antennas 2a and 2b.

At this time, a ratio between signal levels A and B of two types of the pulse code modulated signals (trigger signal 1 and trigger signal 2) as shown in FIG. 14, which are detected in a cross over area Sc by the 3D coil and IC in the RFID tag 3, comes to a ratio, A:B=4:1. Since a magnetic field of the high-frequency magnetic field Sa is stronger than the high-frequency magnetic field Sb when the RFID tag 3 locates at an a-point, the ratio between the signal level A of the trigger signal 1 and the signal level B of the trigger signal 2, is represented by the ratio, A:B=4:1. Therefore, since the ratio between the signal level A of the trigger signal 1 and signal level B of the trigger signal 2 of the pulse code modulated signals is large, even though the RFID tag 3 locates in the cross over area Sc, the 3D coil and the IC can detect only the trigger signal 1 of the high-frequency magnetic field Sa generated by the trigger antenna 2a as a pulse code modulated signal.

Next, when the RFID tag 3 moves to a b-point, since a field strength of the high-frequency magnetic field Sa and a field strength of the high-frequency magnetic field Sb are the same, the ratio between the signal level A of the trigger signal 1 and the signal level B of the trigger signal 2 is represented by A:B=1:1. Herein, since the ratio between the signal level A of the trigger signal 1 and signal level B of the trigger signal 2 of the pulse code modulated signals is small, the 3D coil and the IC in the RFID tag 3 can detect neither of the trigger signal 1 and the trigger signal 2 as a pulse code modulated signal.

Further, when the RFID tag 3 moves to a c-point, since a magnetic field of the high-frequency magnetic field Sb is stronger than that of the high-frequency magnetic field Sa, the ratio between the signal level A of the trigger signal 1 and the signal level B of the trigger signal 2 is represented by A:B=1:4. Accordingly, since the ratio between the signal level A of the trigger signal 1 and the signal level B of the trigger signal 2 is large, even though the RFID tag 3 locates in the cross over area Sc, the 3D coil and the IC can detect only the trigger signal 2 of the high-frequency magnetic field Sb generated by the trigger antenna 2b as a pulse code modulated signal. In this way, even though the RFID tag 3 locates in the cross over area Sc, since the ratio between the signal levels A and B of the pulse code modulated signals (trigger signal 1 and trigger signal 2) varies by the movement of the RFID tag 3, it is possible to make the detection area of the 3D coil variable.

Figure 16:
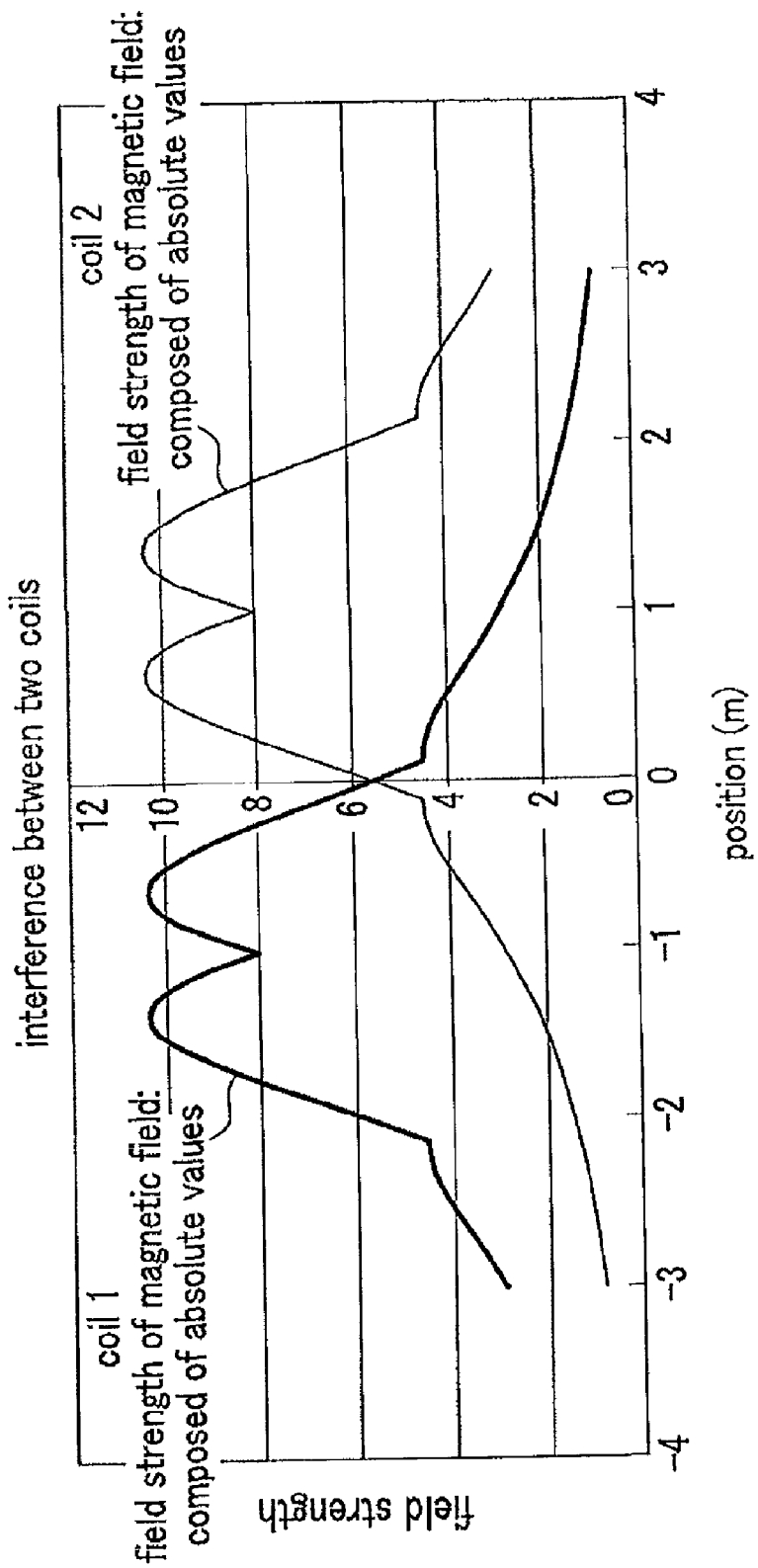
FIG. 16 is a graph showing field strength of composite magnetic fields which are generated by arranging the two trigger antennas shown in FIG. 15.

FIG. 16 is a characteristic diagram showing a field strength of a composite magnetic field generated by arranging the two trigger antennas as shown in FIG. 15. Herein, the abscissa indicates a distance from a center of the two trigger antennas, and the ordinate indicates the field strength of the magnetic field. FIG. 16 shows a level of an absolute value of the field strength of the magnetic field generated by the respective antennas, when the RFID tag 3 locates at a position at a 1 m height from the trigger antennas, and the two antennas 2a and 2b are arranged separated each other from a center position having a 2 m interval between centers of the respective antennas. A boundary for detecting the magnetic field of any of the trigger antennas is at +0.32 m position in the magnetic field in which a ratio between levels of absolute values of the magnetic field strengths (that is, a ratio between the signal levels A and B of the trigger signal 1 and the trigger signal 2) exceeds 2 to 1. Further, A boundary for detecting the magnetic field, when the ratio between levels of the absolute values of the magnetic field strength is at +0.5 m position (that is, a ratio between signal levels A and B of trigger signal 1 and trigger signal 2) is 2.5 to 1. In this way, the smaller the ratio between A and B becomes, the narrower the boundary for detecting the magnetic field becomes, which can make the detection blind area narrower.

Figure 17A:
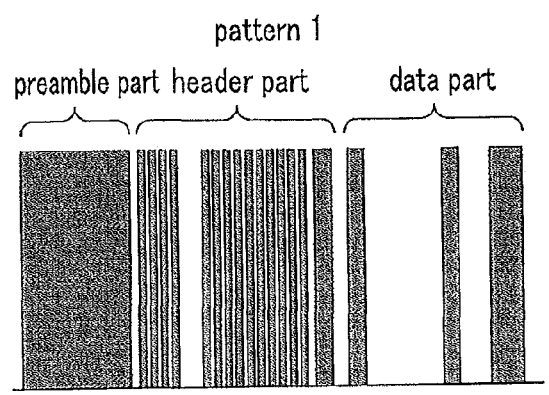
FIGS. 17A to 17C show trigger patterns of pulse code modulated signals.
Figure 17B:
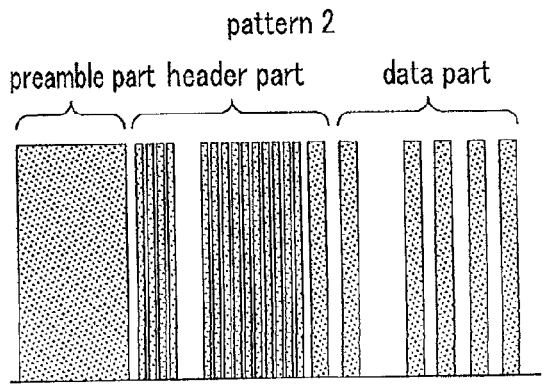
Figure 17C:
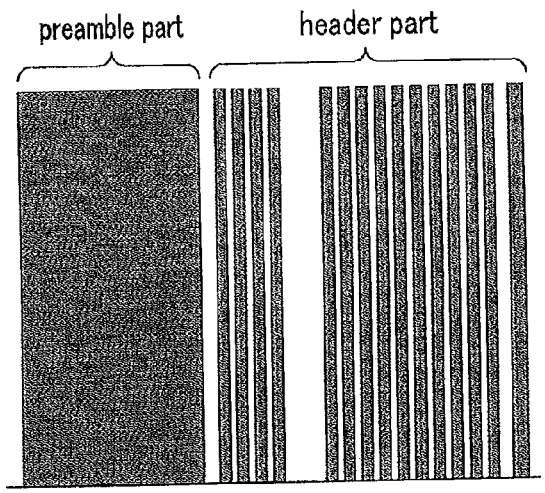

Next, a mechanism how a magnetic field detection circuit of the RFID tag 2 works based on a trigger pattern of the pulse code modulated signal will be explained. FIGS. 17A to 17C show the trigger patterns of the pulse code modulated signals. FIG. 17A shows synchronous bit pattern data of Pattern 1. FIG. 17B shows synchronous bit pattern data of Pattern 2. FIG. 17C shows a preamble part and a header part of Pattern 1 and Pattern 2.

In FIGS. 17A to 17C, since a high-frequency magnetic field, which is a trigger magnetic field, exists in a black colored portion, a waveform of Pattern 1 or Pattern 2 is detected, when the RFID tag 3 enters an area where either of the high-frequency magnetic fields exists. Herein, common parts between Pattern 1 and Pattern 2 are called a preamble part and a header part, which are needed for the RFID tag 3 to determine whether the signal is for the RFID tag 3 or not. If the RFID tag 3 finds these parts in the signal, the RFID tag 3 starts to read the signal considering that a data part will succeed after these parts. Here, if no error is found in the read data part, the RFID tag 3 proceeds processing as the data part is received.

Figure 18:
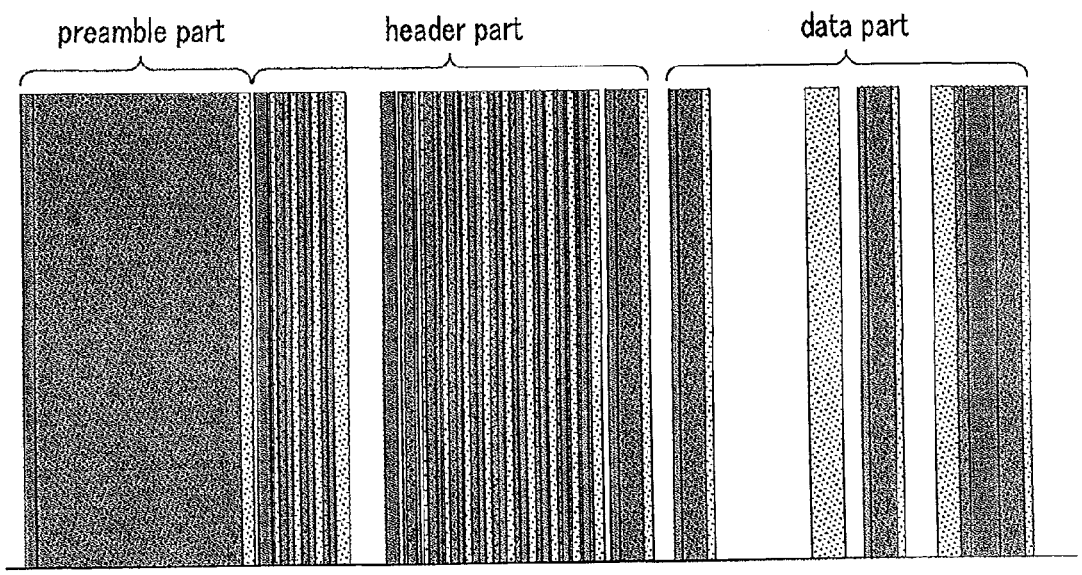
FIG. 18 shows a pulse signal when Pattern 1 and Pattern 2 of FIG. 17 are overlaid.

FIG. 18 shows a pulse pattern in which Pattern 1 and Pattern 2 in FIG. 17 are overlaid. By overlaying trigger signals of Pattern 1 and Pattern 2 in a detailed adjustment on space and time in a magnetic field level, a pulse signal shown in FIG. 18 is provided. Here, if the RFID tag 3 enters an area where magnetic field levels are overlaid, a detection waveform shown in FIG. 18 appears in association with a ratio between signal levels of the trigger signals of Pattern 1 and Pattern 2. Herein, preamble parts and header parts of Pattern 1 and Pattern 2 are overlaid one another and provide a waveform as if the waveform composes a different signal. In other words, a normal header part is lost, and the signal is not processed as data. Further, since the preamble part becomes a part where magnetic fields of trigger signals having the same frequency and different phases are composed each other as a vector, interference may be caused as the preamble part becomes bigger or smaller. As a result, by overlaying Pattern 1 and Pattern 2 in a state of a small ratio between the signal levels, the preamble part and the header part are lost, and the succeeding data part can not be read.

As a position of the RFID tag 3 moves, a field strength of a magnetic field formed by either of the trigger antennas is increased. As a result, since the IC in the RFID tag 3 works to keep a peak of a composite signal definite, either of the trigger signals of Pattern 1 or Pattern 2 becomes lower, a ratio between the pulse code modulated signals shown in FIG. 14 (A:B or B:A) becomes larger, and a pulse waveform of the preamble part and the header part becomes prominent. As a result, since the preamble part and the header part are correctly detected, the IC in the RFID tag 3 can read the succeeding data.

Figure 19A:
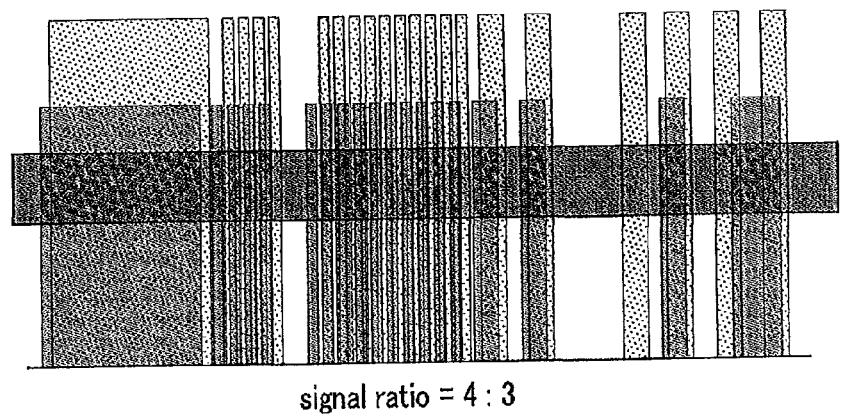
FIGS. 19A and 19B show waveforms of trigger signals in Pattern 1 and Pattern 2.
Figure 19B:
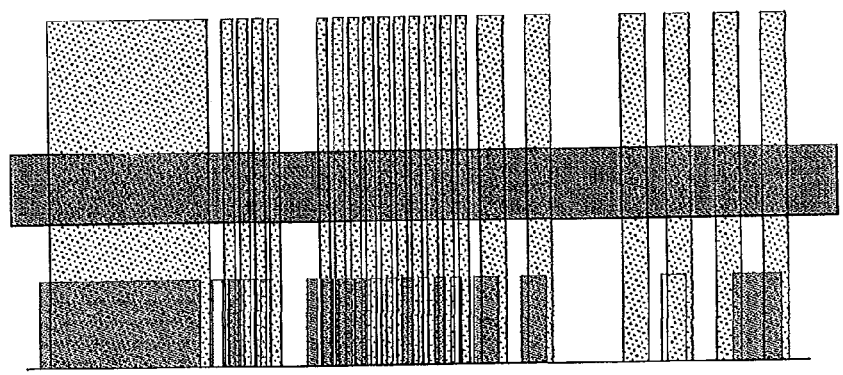
Figure 20A:
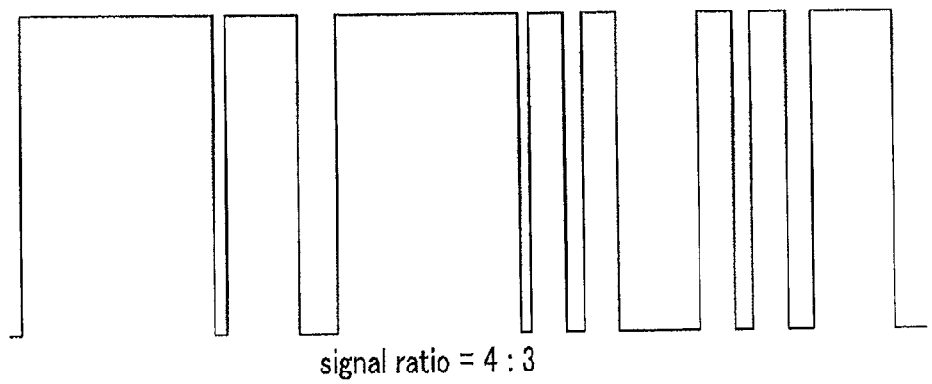
FIGS. 20A and 20B show data on parts of the trigger signals which exist over the threshold level in the waveforms of FIGS. 19A and 19B.
Figure 20B:
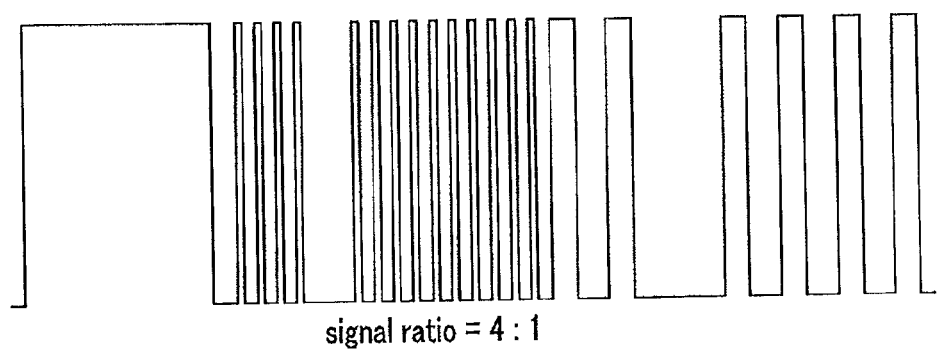

FIGS. 19A and 19B are diagrams showing ratios between trigger signals of Pattern 1 and Pattern 2. FIG. 19A shows a waveform when the ratio between the trigger signals is 4:3. FIG. 19B shows a waveform when the ratio of the trigger signals is 4:1. FIGS. 20A and 20B are diagrams showing waveforms of the trigger signals which are larger than a threshold level in the waveforms in FIGS. 19A and 19B. FIG. 20A shows a waveform when a ratio between the trigger signals is 4:3, and FIG. 20B shows a waveform when the ratio between the trigger signals is 4:1.

As shown in FIG. 19A, when the ratio between the trigger signals is small such as 4:3, since there is a part where the trigger signals of Pattern 1 and Patter 2 are overlaid, over the threshold shown as a belt, the preamble part and the header part can not be detected. As a result, a data signal is not transmitted from the IC in the RFID tag 3.

On the other hand, as shown in FIG. 19B, when the ratio of the trigger signals is 4:1, since there is a part where the trigger signals of Pattern 1 and Pattern 2 are overlaid under the threshold shown as a belt, the preamble part and the header part can be detected. As a result, a data signal is transmitted from the IC in the RFID tag 3. Herein, when the ratio between the data signals of Pattern 1 and Pattern 2 is around 2:1, there are cases that the data signal is transmitted and that the data signal is not transmitted. Therefore, the threshold is determined where the ratio of the trigger signals is 2:1.

Figure 21:
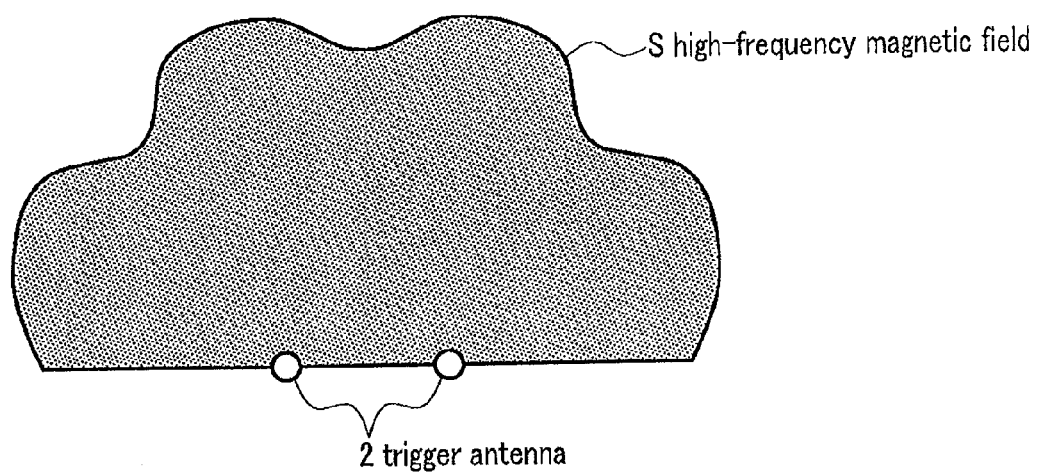
FIG. 21 is a diagram showing an area of a magnetic field in one pattern.
Figure 22:
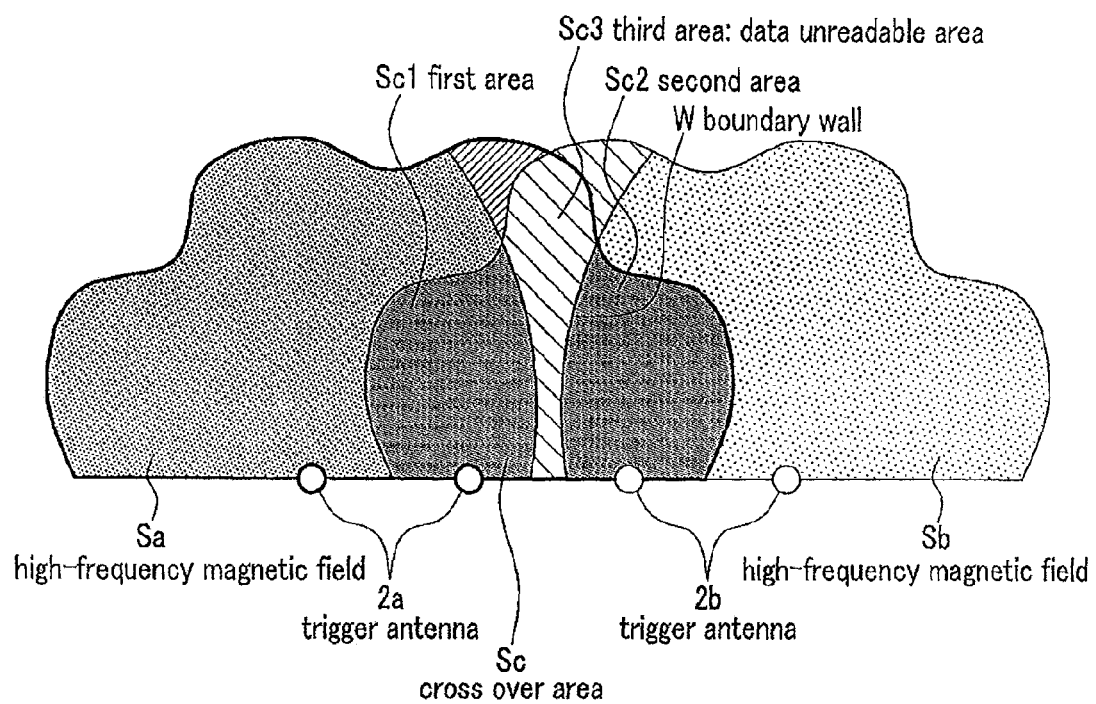
FIG. 22 is a diagram showing areas of the magnetic fields when parts of the magnetic fields in two patterns are overlaid.

FIG. 21 is a diagram showing a magnetic filed in one pattern. FIG. 22 is a diagram showing magnetic fields when a part of the magnetic fields is overlaid in two patterns. That is, as shown in FIG. 21, if a high-frequency magnetic field is emitted from the trigger antenna 1 in one pattern, a high-frequency magnetic field S is formed in an almost spherical shape surrounding the trigger antenna 2. Accordingly, the trigger signal can be detected in a wide area.

On the other hand, as shown in FIG. 22, if high-frequency magnetic fields are emitted from the trigger antennas 2a and 2b in two patterns, whether the trigger signals can be detected or not depends on a ratio between field strengths of the magnetic fields in two patterns. That is, if there are two kinds of the magnetic fields such as Pattern 1 and Pattern 2, a wall separating boundary areas (called a boundary wall) W is formed in which neither of the trigger signals can be detected, in a cross over area Sc where a high-frequency magnetic field Sa and a high-frequency magnetic field Sb are overlaid. The boundary wall W separates two areas.

For example, when there is the cross over area Sc between the two high-frequency magnetic fields Sa and Sb, and the ratio of the trigger signals in Pattern 1 and Pattern 2 is large such as 4:1, data can be read in a first area Sc1 and a second area Sc2. However, the data can not be read in a third area (a part of the area Sc) Sc3 where the ratio of the signals is small such as 4:3. An area where the ratio of the trigger signals is 2:1a becomes the boundary wall W. That is, in the area of the third area Sc3, the trigger signal in Pattern 1 and the trigger signal in Pattern 2 can not be detected. Hereby, the area where the data can not be read (detection blind area) can be suitably changed by the ratio between the trigger signals in Pattern 1 and Pattern 2.

Figure 23:
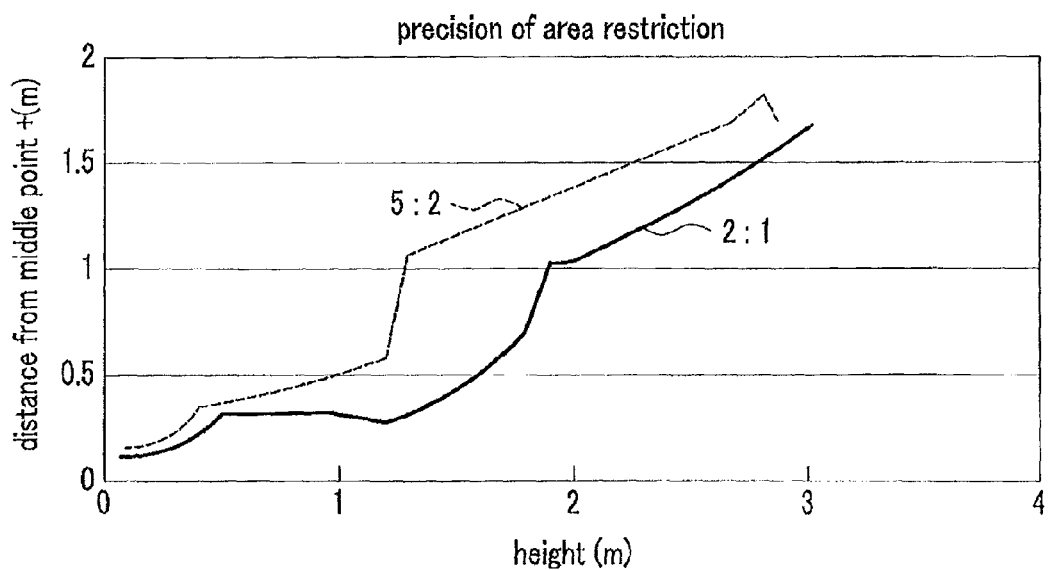
FIG. 23 is a graph showing a detection blind area when a ratio between trigger signals in two patterns is changed.

FIG. 23 is a characteristic diagram showing a detection blind area when the ratio of the trigger signals in two patterns is changed. The abscissa indicates a height from the trigger antenna to the RFID tag 3, and the ordinate indicates a distance from a center of the detection blind area. The characteristic diagram shows data which is actually measured in the detection blind area, when a length of long sides of the two trigger antennas is 1 m respectively and an interval between the centers of the two trigger antennas is 2 m.

For example, when the height of the RFID tag 3 is in a range of 0.5 m to 1.7 m and the ratio between the trigger signals in the two patterns is 2:1, a width of the detection blind area where data is not output is 0.25 m. When the ratio between the trigger signals in the two patterns is 5:2, the width of the detection blind area where data is not output is extended to 1 m.

Here, although the above mentioned explanation has been described assuming that the output of each trigger generator 1 is the same (that is, a size of each magnetic field is the same), it is possible to change a shape of the detection blind area (or detection area), by giving a difference between the outputs of the trigger generators 1 which are adjacently arranged each other.

Figure 24:
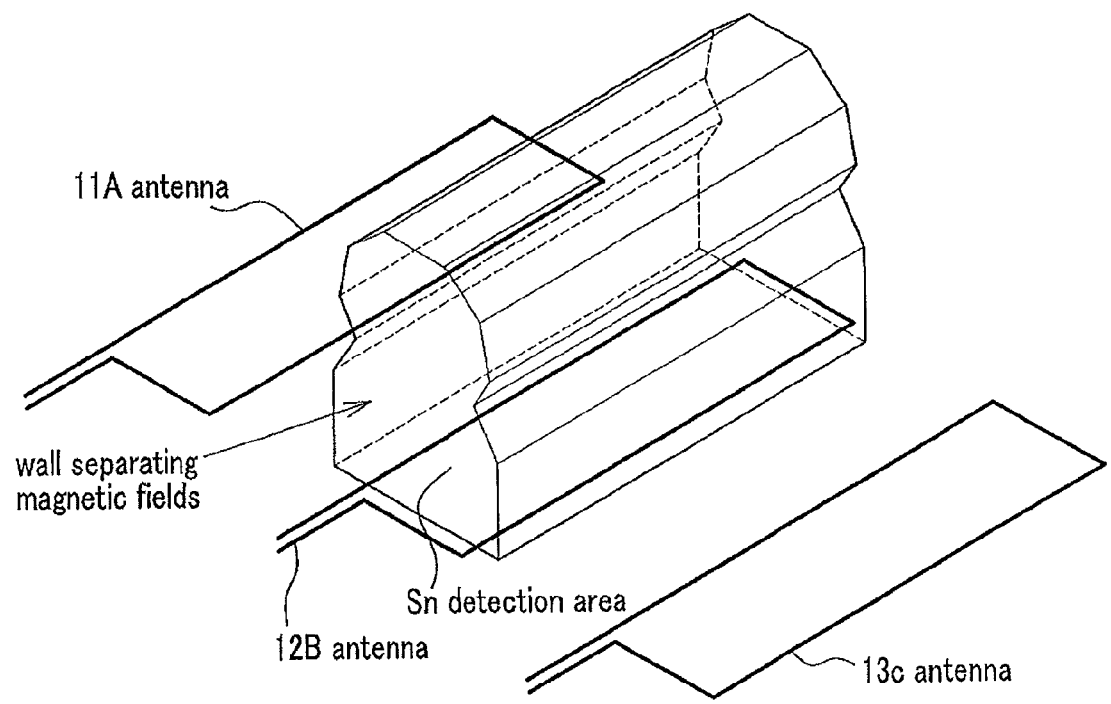
FIG. 24 is a model diagram showing three-dimensionally a state of an area restriction of high-frequency magnetic fields by the three trigger antennas shown in FIG. 7.

FIG. 24 is a perspective view showing three-dimensionally a state of an area restriction in the high-frequency magnetic fields by the three trigger antennas shown in FIG. 7. As shown in FIG. 24, in a detection area Sn (restricted detection area) in the high-frequency magnetic field generated by a B antenna 12, a dome-shaped wall separating magnetic fields is formed. Therefore, if an area in the dome-shaped wall separating magnetic fields (that is, a detection area Sn) is narrowed so that an interval between the walls is made to be about 0.5 m, it is possible to actually prevent a piggyback because only a person having the RFID tag 3 can be detected.

Further, if a means for detecting or estimating the number of persons who are in the detection area Sn (person number counting means) is provided, it is possible to determine whether there is the piggyback or not (piggybacking detection means). Herein, the detection is performed based on information obtained through apparatuses such as a camera monitoring the detection area Sn in FIG. 24, a laser irradiating the detection area Sn, a sensor detecting infrared rays from the detection area Sn, and a weighing machine weighing a load on a floor of the detection area Sn. That is, when the RFID tag 3 is detected in the detection area Sn, and a plurality of persons are detected by the person number counting means, it is possible to detect the piggyback. For example, it is possible to detect a case that a person having no RFID tag 3 is lined at a side of a person having the RFID tag 3 in the detection area Sn in FIG. 24, as the piggyback.

Further, in addition to the person number counting means, by providing a means to detect or estimate the number of the RFID tags 3 which exist in the detection area Sn, and comparing the number of the RFID tags with the number of the persons, it is possible to determine whether there is the piggyback or not (piggybacking detection means), when the number of the persons is larger than the number of the RFID tags.

Herein, when the RFID tag 3 receives a pulse cord modulated signal (trigger ID signal), the RFID tag 3 transmits a discrimination signal by a very weak radio wave having discrimination information (trigger ID) contained in the pulse code modulated signal and a tag discrimination information (tag ID) included in the discrimination signal. Therefore, it is easy to count the number of the RFID tags 3 based on the tag discrimination information. Furthermore, when the system receives discrimination information from the RFID tag 3, it is easy to know which trigger antenna 2 emits the trigger signal based on the trigger ID.

EXPERIMENTAL RESULTS

The entrance/exit management system realized by the respective embodiments mentioned above, can provide the following performance when the RFID tag 3 is moving in an area of a high-frequency magnetic field. Here, data on the performance is obtained by actual measurement in an environment that there is no disturbance factor such as a magnetic circuit, an anti-magnetic circuit, noises and reflectors using a trigger antenna of a 1 m length.

1. A probability that the RFID tag 3 can be read out is almost 100%, when the RFID tag 3 is moving in about 30 km/h. That is, when one RFID tag 3 passes through an area 100 times in 30 km/h, almost 100 times the RFID tag 3 can be read out.

2. A probability that the ten RFID tags 3 can be simultaneously read out is almost 100%, when they are moving in 8 km/h. That is, when the ten RFID tags 3 simultaneously pass through an area 100 times in 8 km/h, almost 100 times all of the ten RFID tags 3 can be read.

3. A minimum communication time needed for the system, for example, is 100 ms or less. If a start time is set on the time when the RFID tag 3 runs into a trigger area, and an end time is set on the time when the RFID receiver completes transmitting the ID information of the RFID tag 3 to a host system, a resulting time of measuring an interval between the start time and the end time, is 100 ms or less. Here, a data hold time of the RFID receiver is not included in the above-mentioned time.

Therefore, according to the present invention, when the three trigger antennas are adjacently arranged each other, it is possible to narrow the detection area of the high-frequency magnetic field formed by the trigger antenna located at the middle of the trigger antennas. As a result, it is possible to detect a moving direction of the RFID tag by an inherent trigger ID signal which is contained in the three high-frequency magnetic fields formed by the three trigger antennas. Additionally, it is possible to detect only a specific RFID tag by the narrowed detection area locating at a middle position. Thus, the piggyback can be checked to prevent it.

An arrangement of the trigger antennas 2 is not limited to a layout as arranging three parallel lines shown in FIG. 5. An appropriate alteration and a modification are possible in scope of the present invention. The two trigger antennas may be sufficient to check the piggyback. For example, it is possible to restrict the detection area Sn to a narrow area by using the two trigger antennas 2 and a boundary wall, for example, as shown in FIG. 22. Accordingly, a check of the piggyback can be appropriately performed.

What is claimed is:

1. A tag detecting system comprising:
a first generator emitting a pulse code modulated signal of a predetermined intensity through a first antenna;
a second generator emitting a pulse code modulated signal of a predetermined intensity through a second antenna;
an RFID tag detecting the pulse code modulated signal from the first antenna and the second antenna, and transmitting a discrimination signal by responding to the pulse code modulated signal; and
a receiver receiving the discrimination signal through a receiving antenna, wherein
the first antenna and the second antenna are adjacently arranged to produce a cross over area between high-frequency magnetic fields formed by both the first and second antennas,
each of the first generator and the second generator emits the pulse code modulated signal at such a timing that spaces included in a predetermined part of the pulse code modulated signal emitted by any one of the first and second generators is occupied by the pulse code modulated signal emitted by the other the first and second generators, and
the RFID tag is made not to detect the pulse code modulated signals due to the spaces being occupied, if the RFID tag is located in the cross over area or a part of the cross over area.

2. The tag detecting system according to claim 1, in which the RFID tag transmits the discrimination signal including discrimination information contained in the pulse code modulated signal, and tag discrimination information on the RFID tag, on receiving the respective pulse code modulated signals, where the tag detecting system determines,
whether the discrimination signal corresponds to the pulse code modulated signal from the first antenna or the pulse code modulated signal from the second antenna, when the tag detecting system receives the discrimination signal through the receiving antenna transmitted from the RFID tag, and
whether the RFID tag moves from an area of a magnetic field formed by the first antenna to an area of a magnetic field formed by the second antenna or the RFID tag moves from the area of the magnetic field formed by the second antenna to the area of the magnetic field formed by the first antenna, by a receiving order, when the tag detecting system receives both discrimination signals which correspond to the pulse code modulated signals from the first antenna and the second antenna.

3. The tag detecting system according to claim 1, wherein the RFID tag is not capable of detecting the received pulse code modulated signals, when the RFID tag receives the pulse cord modulated signals from a plurality of the antennas, and spaces of the predetermined parts are occupied by making a ratio or a difference between field strengths of the plurality of the received pulse code modulated signals be in a par state.

4. A tag detecting system comprising:
a first generator emitting a pulse code modulated signal through a first antenna of a predetermined field strength;
a second generator emitting a pulse code modulated signal through a second antenna of a predetermined field strength;
a third generator emitting a pulse code modulated signal through a third antenna of a predetermined field strength;
an RFID tag detecting the pulse code modulated signal at least from the first antenna, the second antenna and the third antenna, and transmitting a discrimination signal by responding to the pulse code modulated signal; and
a receiver receiving the discrimination signal through a receiving antenna, wherein
the first antenna and the second antenna are adjacently arranged to produce a first cross over area where high-frequency magnetic fields formed by both antennas are overlaid each other;
the first antenna and the third antenna are adjacently arranged to produce a second cross over area where high-frequency magnetic fields formed by both antennas are overlaid each other;

each of the first generator and the second generator emits the pulse code modulated signal at such a timing that spaces included in a predetermined part of the pulse code modulated signal emitted by any one of the first and second generators is occupied by the pulse code modulated signal emitted by the other of the first and second generators;

each of the first generator and the third generator emits the pulse code modulated signal at such a timing that spaces included in a predetermined part of the pulse code modulated signal emitted by any one of the first and third generators is occupied by the pulse code modulated signal emitted by the other of the first and third generators; and a detection area in which the RFID tag is capable of detecting the pulse code modulated signal from the first antenna, is made to be restricted so that the RFID tag is made not to detect the pulse code modulated signals due to the spaces being occupied, if the RFID tag is located in the first cross over area or the second cross over area, or a part of the first cross over area or the second cross over area.

5. The tag detecting system according to claim 4, in which the RFID tag transmits the discrimination signal including tag discrimination information of the RFID tag, further comprising:

a person number counting means for detecting or estimating the number of persons who exist in the restricted detection area;

a tag counting means for detecting or estimating the number of the RFID tags which exist in the detection area based on the tag discrimination information included in the discrimination signal received by the receiver; and a piggybacking detection means for determining that there is a piggyback when the number of the RFID tags detected or estimated and the number of the persons detected or estimated are compared, and the number of the persons is larger than the number of the RFID tags.

6. The tag detecting system according to claim 4, further comprising:

a person number counting means for detecting or estimating the number of persons who exist in the restricted detection area, and a piggybacking detection means for determining that there is a piggyback when the number of persons detected or estimated by the person number counting means is two or more.

7. The moving object detecting method according to claim 6, wherein the integrated circuit detects the cross over trigger signal in the cross over area based on a size of a ratio or a difference between voltage levels of the respective pulse code modulated signals.

8. The moving object detecting method according to claim 7, wherein the integrated circuit receives and transmits the ID information by detecting the cross over trigger signal when the ratio or the difference between the voltage levels of the respective pulse code modulated signals is larger than a threshold level, and the integrated circuit does not detect the cross over trigger signal when the ratio or the difference between the voltage levels of the respective trigger signals is smaller than the threshold level.

9. A moving object detecting method for detecting a movement of an object mounting an RFID tag comprised of:

a step that a plurality of trigger antennas respectively form high-frequency magnetic fields in which there is a cross over area where parts of the magnetic fields are adjacently overlaid;

a step that a plurality of generators emit pulse cord modulated signals corresponding to the respective high-frequency magnetic fields, and generate cross over trigger signals by overlaying the respective pulse code modulated signals in the cross over area;

a step that an integrated circuit mounted on the RFID tag receives and transmits ID information corresponding to the pulse code modulated signal in the respective high-frequency magnetic fields; and a step that the integrated circuit receives and transmits ID information corresponding to the cross over trigger signal when the integrated circuit detects the cross over trigger signal in the cross over area.

10. An entrance/exit management system for monitoring a movement of a person having an RFID tag including:

a plurality of trigger antennas which form high-frequency magnetic fields respectively in which there is a cross over area where adjacent magnetic fields are partially overlaid; and an integrated circuit which is mounted on the RFID tag, detects respective trigger signals included in the magnetic field of the respective high-frequency magnetic fields, and receives and transmits ID information corresponding to the respective trigger signals, wherein the integrated circuit does not receive and transmit the ID information in the cross over area, when the integrated circuit detects a cross over trigger signal formed by the respective trigger signals contained in the magnetic fields overlaid.

11. The entrance/exit management system according to claim 10, wherein each of the trigger signals is a pulse code modulated signal, and the cross over trigger signal is a signal in which the pulse code modulated signals are overlaid so that time spaces included in a predetermined part of one pulse code modulated signal are occupied by the other pulse code modulated signal.

12. The entrance/exit management system according to claim 11, wherein the integrated circuit determines whether or not the integrated circuit detects a cross over trigger signal in a preamble part and a header part which are located in a lead part of the pulse code modulated signal.

13. The entrance/exit management system according to claim 12, wherein the integrated circuit determines whether or not the integrated circuit detects the cross over trigger signal in the cross over area based on a ratio or a difference between voltage levels of the respective pulse code modulated signals.

14. The entrance/exit management system according to claim 13, wherein the integrated circuit detects the cross over trigger signal, and receives and transmits the ID information, when the ratio or the difference between the voltage levels of the respective pulse code modulated signals is larger than a threshold level, and the integrated circuit does not detect the cross over trigger signal, when the ratio or the differences between the voltage levels of the respective pulse code modulated signals is smaller than the threshold level.

15. An entrance/exit management system for monitoring a movement of a person having an RFID tag comprising:

three trigger antennas which respectively form high-frequency magnetic fields having cross over areas in which adjacent magnetic fields are partially overlaid;

the RFID tag which includes an integrated circuit; and the integrated circuit which detects respective pulse code modulated signals included in magnetic fields of the respective high-frequency magnetic fields, receives and transmits ID information corresponding to the respective pulse code modulated signals, and does not detect a cross over trigger signal in which the pulse code modulated signals included in the magnetic fields are overlaid, at least in a partial area of the cross over area; wherein the integrated circuit detects a direction of movement of the RFID tag based on a process that ID information changes corresponding to the respective pulse code modulated signals, and the integrated circuit discriminates the specific RFID tag in the high-frequency magnetic field located between the partial areas.

16. The entrance/exit management system according to claim 15, wherein the partial area is capable of being shifted based on the ratio of the difference between the voltage levels of the respective pulse code modulated signals.

17. The entrance/exit management system according to claim 16, wherein the partial area is shifted to a wide area in the cross over area, when the ratio or the difference between the voltage levels of the respective pulse code modulated signals is larger than the threshold level, and the partial areas is shifted to a narrow area in the cross over area when the ratio or the difference between the voltage levels of the respective pulse code modulated signals is larger than the threshold level.

18. A moving object detecting method for detecting a movement of an object mounting an RFID tag comprising:

a step of forming a first high-frequency magnetic field corresponding to a first pulse code modulated signal including first trigger ID information and a second high-frequency magnetic field corresponding to a second pulse code modulated signal including second trigger ID information, such that there is a first cross over area where a part of the magnetic fields is adjacently overlaid, wherein the RFID tag includes a three-dimensional coil and an integrated circuit composing vector values of the three-dimensional high-frequency magnetic fields, received by the three- dimensional coil, thereby to output signal levels as scalar values, and if a part of the first pulse code modulated signal and the second pulse code modulated signal is overlaid when the signal levels of the scalar values are the same, at least a part of spaces of the modulated signals is occupied, which makes the RFID tag incapable of detecting the modulated signals, and a step of transmitting a signal including trigger ID information corresponding to the pulse code modulated signal at the larger signal level and tag ID information of the RFID itself by the RFID tag, if a ratio of the signal levels is smaller than a threshold value; a larger signal level being defined as a denominator by comparing the first pulse code modulated signal thus received to the second pulse code modulated signal thus received, in the first cross over area using the scalar values of the signal levels, and a step of transmitting no signal including the tag ID information of the RFID tag itself by the RFID tag, if the ratio of the signal levels is larger than the threshold value.

19. The moving object detecting method for detecting a movement of an object according to claim 18, wherein an area where the RFID tag transmits a signal including the first trigger ID information by detecting the first pulse code modulated signal, an area where the RFID tag transmits a signal including the second trigger ID information by detecting the second pulse code modulated signal, and an area where the RFID tag is incapable of detecting both first pulse code modulated signal and second pulse code modulated signal; the area being placed between both aforementioned areas, are formed in the first cross over area.

20. The moving object detecting method for detecting a movement of an object according to claim 18, comprising:

a step of forming a third high-frequency magnetic field and the second high-frequency magnetic field, such that there is a second cross over area where a part of the magnetic fields is adjacently overlaid, wherein if a part of the second pulse code modulated signal and the third pulse code modulated signal is overlaid when the signal levels of the scalar values are the same, at least a part of spaces of the modulated signals is occupied, which makes the RFID tag incapable of detecting the second pulse code modulated signal and the third pulse code modulated signal, and a step of transmitting a signal including trigger ID information corresponding to the pulse code modulated signal at a larger signal level and tag ID information of the RFID itself by the RFID tag, if a ratio of the signal levels is smaller than a threshold value; the larger signal level being defined as a denominator by comparing the second pulse code modulated signal thus received to the third pulse code modulated signal thus received, in the second cross over area using the scalar values of the signal levels, and a step of transmitting no signal including the tag ID information of the RFID tag itself by the RFID tag, if the ratio of the signal levels is larger than the threshold value.

21. The moving object detecting method for detecting a movement of an object according to claim 20, wherein an area where the RFID tag transmits a signal including the second trigger ID information by detecting the second pulse code modulated signal, an area where the RFID tag transmits a signal including the third trigger ID information by detecting the third pulse code modulated signal, and an area where the RFID tag is incapable of detecting both second pulse code modulated signal and third pulse code modulated signal; the area being placed between both aforementioned areas, are formed in the second cross over area.

22. The moving object detecting method for detecting a movement of an object according to claim 20, comprising:

a step of comparing the number of the RFID tags existing in an area where the RFID tag transmits a signal including the second trigger ID information to the number of persons existing in the area; and a step of determining whether or not there is a piggyback when the number of the persons is large.

23. The moving object detecting method for detecting a movement of an object according to claim 18, wherein at least a part of the spaces of the modulated signals is a header part of the pulse code modulated signals.

24. A tag detecting system comprising:

a first generator emitting a first pulse code modulated signal including first trigger ID information to a first antenna, and forming a first high-frequency magnetic field corresponding to the first pulse code modulated signal through the first antenna;

a second generator emitting a second pulse code modulated signal including second trigger ID information to a second antenna, and forming a second high-frequency magnetic field corresponding to the second pulse code modulated signal through the second antenna; and an RFID tag including a three-dimensional coil and an integrated circuit composing vector values of the three-dimensional high-frequency magnetic fields, received by the three- dimensional coil, thereby to output signal levels as scalar values, wherein the first and the second high-frequency magnetic fields are formed such that there is a first cross over area where a part of the first and the second high-frequency magnetic fields is adjacently overlaid;

if a part of the first pulse code modulated signal and the second pulse code modulated signal is overlaid when the signal levels of the scalar values are the same, at least a part of spaces of the modulated signals is occupied, which makes the RFID tag incapable of detecting the first pulse code modulated signal and the second pulse code modulated signal, the RFID tag transmits a signal including trigger ID information corresponding to the pulse code modulated signal at a larger signal level and tag ID information of the RFID itself, if a ratio of the signal levels is smaller than a threshold value; the larger signal level being defined as a denominator by comparing the first pulse code modulated signal thus received to the second pulse code modulated signal thus received, in the first cross over area using the scalar values of the signal levels, and the RFID tag transmits no signal including the tag ID information of itself, if the ratio of the signal levels is larger than the threshold value.

25. The tag detecting system comprising according to claim 24, wherein an area where the RFID tag transmits a signal including the first trigger ID information by detecting the first pulse code modulated signal, an area where the RFID tag transmits a signal including the second trigger ID information by detecting the second pulse code modulated signal, and an area where the RFID tag is incapable of detecting both first pulse code modulated signal and second pulse code modulated signal; the area being placed between both aforementioned areas, are formed in the first cross over area.

26. The tag detecting system according to claim 24, further comprising:

a third generator emitting a third pulse code modulated signal including third trigger ID information to a third antenna, and forming a third high-frequency magnetic field corresponding to the third pulse code modulated signal through the third antenna, wherein the third and the second high-frequency magnetic fields are formed such that there is a second cross over area where a part of the third and the second high-frequency magnetic fields is adjacently overlaid;

if a part of the third pulse code modulated signal and the second pulse code modulated signal is overlaid when the signal levels of the scalar values are the same, at least a part of spaces of the modulated signals is occupied, which makes the RFID tag incapable of detecting the third pulse code modulated signal and the second pulse code modulated signal;

the RFID tag transmits a signal including trigger ID information corresponding to the pulse code modulated signal at a larger signal level and tag ID information of the RFID itself, if a ratio of the signal levels is smaller than a threshold value; the larger signal level being defined as a denominator by comparing the second pulse code modulated signal thus received to the third pulse code modulated signal thus received, in the second cross over area using the scalar values of the signal levels, and the RFID tag transmits no signal including the tag ID information of itself, if the ratio of the signal levels is larger than the threshold value.

27. The tag detecting system according to claim 26, wherein an area where the RFID tag transmits a signal including the second trigger ID information by detecting the second pulse code modulated signal, an area where the RFID tag transmits a signal including the third trigger ID information by detecting the third pulse code modulated signal, and an area where the RFID tag is incapable of detecting both second pulse code modulated signal and third pulse code modulated signal; the area being placed between both aforementioned areas, are formed in the second cross over area.

28. The tag detecting system according to claim 26, further comprising:

a person number counting means for detecting or estimating the number of persons who exist in the area where the RFID tag transmits the signal including the second trigger ID information, and a piggybacking detection means for detecting that there is a piggyback when the number of the persons is larger than the number of the RFID tags, when the piggybacking detection means compares the number of the RFID tags existing in the area where the RFID tag transmits the signal including the second trigger ID information to the number of the persons existing in the aforementioned RFID tag transmitting area; the number of the persons being detected by the person number counting means.

29. The tag detecting system according to claim 24, wherein at least a part of the spaces of the modulated signals is a header part of the pulse code modulated signals.

30. An entrance / exit management system for monitoring a movement of a person having an RFID tag comprising:

a first generator emitting a first pulse code modulated signal including first trigger ID information to a first antenna, and forming a first high-frequency magnetic field corresponding to the first pulse code modulated signal through the first antenna;

a second generator emitting a second pulse code modulated signal including second trigger ID information to a second antenna, and forming a second high-frequency magnetic field corresponding to the second pulse code modulated signal through the second antenna, in which the first and the second high-frequency magnetic fields are formed such that there is a first cross over area where a part of the first and the second high-frequency magnetic fields is adjacently overlaid, wherein the RFID tag includes a three-dimensional coil and an integrated circuit composing vector values of the three-dimensional high-frequency magnetic fields, received by the three- dimensional coil, thereby to output signal levels as scalar values;

if a part of the first pulse code modulated signal and the second pulse code modulated signal is overlaid when the signal levels of the scalar values are the same, at least a part of spaces of the modulated signals is occupied, which makes the RFID tag incapable of detecting the first pulse code modulated signal and the second pulse code modulated signal;

the RFID tag transmits a signal including trigger ID information corresponding to the pulse code modulated signal at a larger signal level and tag ID information of the RFID itself, if a ratio of the signal levels is smaller than a threshold value; the larger signal level being defined as a denominator by comparing the first pulse code modulated signal thus received to the second pulse code modulated signal thus received, in the first cross over area using the scalar values of the signal levels, and the RFID tag transmits no signal including the tag ID information of itself, if the ratio of the signal levels is larger than the threshold value.

31. The entrance / exit management system according to claim 30, wherein an area where the RFID tag transmits a signal including the first trigger ID information by detecting the first pulse code modulated signal, an area where the RFID tag transmits a signal including the second trigger ID information by detecting the second pulse code modulated signal, and an area where the RFID tag is incapable of detecting both first pulse code modulated signal and second pulse code modulated signal; the area being placed between both aforementioned areas, are formed in the first cross over area.

32. The entrance / exit management system according to claim 30, further comprising:

a third generator emitting a third pulse code modulated signal including third trigger ID information to a third antenna, and forming a third high-frequency magnetic field corresponding to the third pulse code modulated signal through the third antenna, wherein the third and the second high-frequency magnetic fields are formed such that there is a second cross over area where a part of the third and the second high-frequency magnetic fields is adjacently overlaid;

if a part of the third pulse code modulated signal and the second pulse code modulated signal is overlaid when the signal levels of the scalar values are the same, at least a part of spaces of the modulated signals is occupied, which makes the RFID tag incapable of detecting the third pulse code modulated signal and the second pulse code modulated signal;

the RFID tag transmits a signal including trigger ID information corresponding to the pulse code modulated signal at a larger signal level and tag ID information of the RFID itself, if a ratio of the signal levels is smaller than a threshold value; the larger signal level being defined as a denominator by comparing the second pulse code modulated signal thus received to the third pulse code modulated signal thus received, in the second cross over area using the scalar values of the signal levels, and the RFID tag transmits no signal including the tag ID information of itself, if the ratio of the signal levels is larger than the threshold value.

33. The entrance / exit management system according to claim 32, wherein an area where the RFID tag transmits a signal including the second trigger ID information by detecting the second pulse code modulated signal, an area where the RFID tag transmits a signal including the third trigger ID information by detecting the third pulse code modulated signal, and an area where the RFID tag is incapable of detecting both second pulse code modulated signal and third pulse code modulated signal; the area being placed between both aforementioned areas, are formed in the second cross over area.

34. The entrance / exit management system according to claim 32, further comprising:

a person number counting means for detecting or estimating the number of persons who exist in the area where the RFID tag transmits the signal including the second trigger ID information, and a piggybacking detection means for detecting that there is a piggyback when the number of the persons is larger than the number of the RFID tags, when the piggybacking detection means compares the number of the RFID tags existing in the area where the RFID tag transmits the signal including the second trigger ID information to the number of the persons existing in the aforementioned RFID tag transmitting area; the number of the persons being detected by the person number counting means.

35. The entrance / exit management system according to claim 30, wherein at least a part of the spaces of the modulated signals is a header part of the pulse code modulated signals.

* * * * *